(12) United States Patent
Pacheco, Jr.

(10) Patent No.: US 7,225,710 B2
(45) Date of Patent: Jun. 5, 2007

(54) COMBINATION DRIVER AND COMBINATION FASTENER

(75) Inventor: Raymond A. Pacheco, Jr., Harleysville, PA (US)

(73) Assignee: Synthes GmbH, Oberdorf (CH)

( * ) Notice: Subject to any disclaimer, the term of this patent is extended or adjusted under 35 U.S.C. 154(b) by 0 days.

(21) Appl. No.: 11/139,887

(22) Filed: May 27, 2005

(65) Prior Publication Data

US 2006/0266168 A1    Nov. 30, 2006

(51) Int. Cl.
*B25B 15/00* (2006.01)
(52) U.S. Cl. ............................ 81/460; 81/436; 411/403
(58) Field of Classification Search ................ 81/436, 81/441, 460, 461; 411/403, 404, 919
See application file for complete search history.

(56) References Cited

U.S. PATENT DOCUMENTS

| | | | | |
|---|---|---|---|---|
| 2,969,250 A | | 1/1961 | Kull ............................ 287/126 |
| 3,584,667 A | | 6/1971 | Reilnad ........................ 145/50 |
| 4,269,246 A | | 5/1981 | Larson et al. ................. 81/460 |
| 4,328,721 A | | 5/1982 | Massari ........................ 81/439 |
| 4,367,664 A | | 1/1983 | Ekshtut ........................ 81/436 |
| 4,488,462 A | | 12/1984 | Wall ............................. 81/439 |
| 4,581,957 A | | 4/1986 | Dossier ...................... 81/121.1 |
| 4,867,018 A | | 9/1989 | Spector ........................ 81/439 |
| 4,938,731 A | * | 7/1990 | Nguyen et al. ............. 464/158 |
| 4,970,922 A | * | 11/1990 | Krivec ......................... 81/460 |
| 4,998,454 A | * | 3/1991 | Chaconas et al. ............. 81/460 |
| 5,207,132 A | * | 5/1993 | Goss et al. .................... 81/460 |
| 5,251,521 A | | 10/1993 | Burda et al. .................. 81/460 |
| 5,279,190 A | | 1/1994 | Goss et al. .................... 81/460 |
| 5,287,778 A | | 2/1994 | Cook ........................... 81/442 |
| 5,291,811 A | * | 3/1994 | Goss ............................ 81/460 |
| 5,408,905 A | * | 4/1995 | Mikic et al. .................. 81/460 |
| 5,461,952 A | | 10/1995 | Goss ............................ 81/460 |
| 5,509,334 A | | 4/1996 | Shinjo .......................... 81/460 |
| 5,528,966 A | | 6/1996 | Coppejans ................... 81/460 |

(Continued)

FOREIGN PATENT DOCUMENTS

EP    0 458 771 A1    11/1991

(Continued)

OTHER PUBLICATIONS

Sci.Electronics.Repair FAQ: Troubleshooting and Repair of Consumer Electronics Equipment, Chapter 3.4 "Getting inside consumer electronic equipment," 5 pages, Copyright © 1992-2005 by Filip M. Gieszczykiewicz and Samuel M. Goldwasser.

(Continued)

*Primary Examiner*—Lee D. Wilson
*Assistant Examiner*—Anthony Ojini
(74) *Attorney, Agent, or Firm*—Woodcock Washburn LLP

(57) ABSTRACT

A driver has a tip that enables it to engage each one of a conventional hexagonal-head fastener and a conventional lobed-head fastener. The tip includes alternating flutes and crests. The crests are substantially flat to engage straight walls of a hexagonal-head. The flutes engage the lobed head of the fastener. A socket-type driver engages each type of conventional fastener. A fastener and a pair of socket-type fasteners have alternating flutes, which can be engaged by a conventional lobed-head driver, and crests or sidewall surfaces, which can be engaged by a conventional hexagonal-head driver.

19 Claims, 22 Drawing Sheets

U.S. PATENT DOCUMENTS

| | | | |
|---|---|---|---|
| 5,553,983 A | 9/1996 | Shinjo | 411/404 |
| 5,577,871 A | 11/1996 | Brugola | 411/404 |
| 5,674,036 A | 10/1997 | Hsieh | 411/410 |
| 5,873,290 A | 2/1999 | Chaconas | 81/436 |
| 6,016,727 A | 1/2000 | Morgan | 81/436 |
| 6,128,983 A | 10/2000 | Arnn | 81/460 |
| 6,152,000 A | 11/2000 | Mowins | 81/441 |
| 6,367,358 B1 | 4/2002 | Stacy | 81/436 |
| 6,393,953 B1 | 5/2002 | Totsu | 81/452 |
| 6,655,241 B2 * | 12/2003 | Kozak | 81/460 |
| 6,655,888 B2 | 12/2003 | Schultz | 411/403 |
| 6,685,412 B2 | 2/2004 | Altarac et al. | 411/403 |
| 6,736,580 B2 | 5/2004 | Schultz | 411/403 |

FOREIGN PATENT DOCUMENTS

| | | | |
|---|---|---|---|
| GB | 2 353 240 A | 2/2001 | |

OTHER PUBLICATIONS

TiVo Updating Over Dedicated Internet HOWTO: Getting a BASH prompt, Chapter 2.3 "Pulling the hard drive," 3 pages, Copyright © 2000 by Frank Pineau.

* cited by examiner

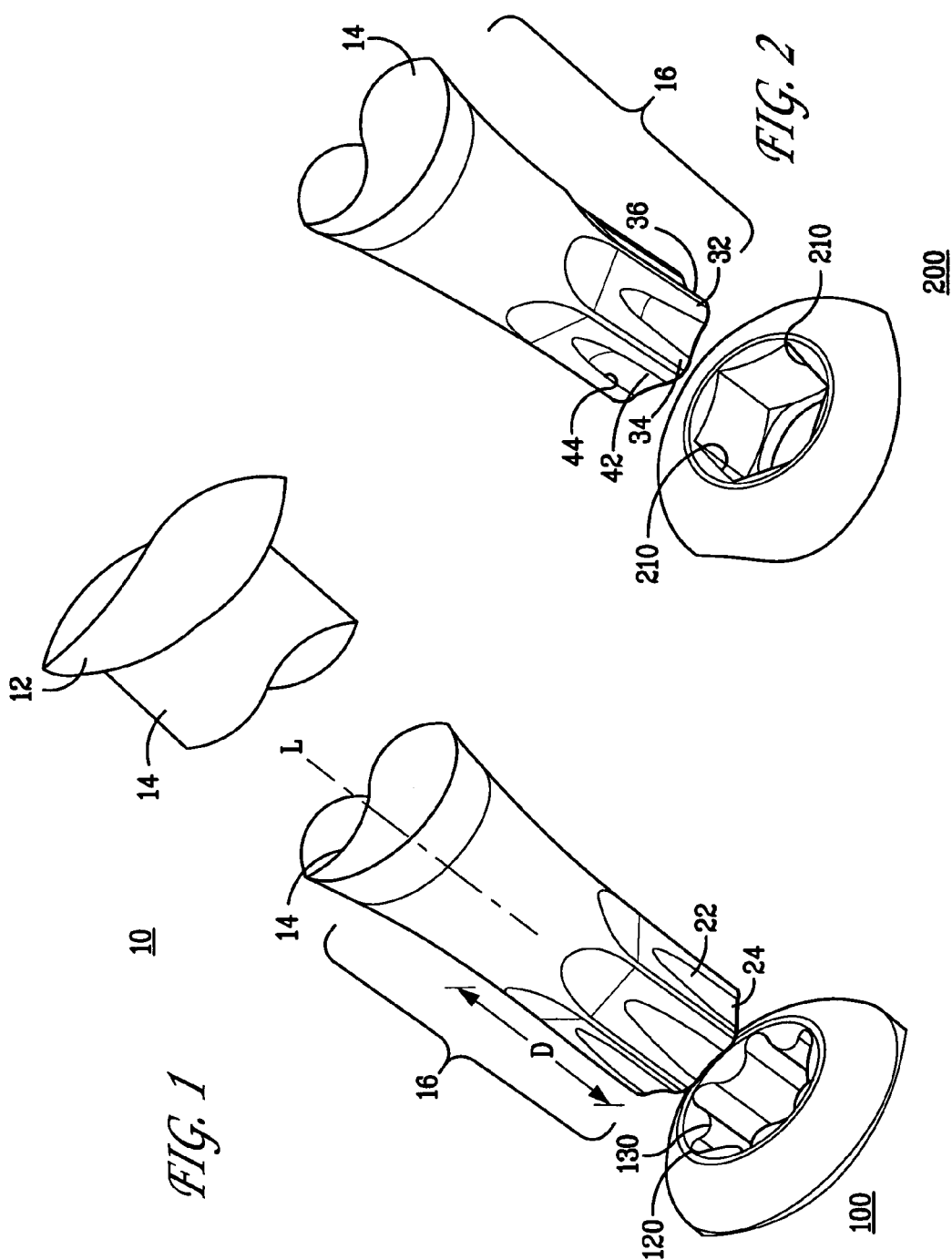

COMBINATION DRIVER AND COMBINATION FASTENER

BACKGROUND

This invention relates to fasteners and drivers for fasteners, and more particularly to combination fasteners that can be driven by more than one configuration of driver head and combination drivers that can drive more than one configuration of fastener head.

Combination drivers capable of engaging and driving more than one configuration of threaded fastener can be useful while assembling parts. For example, numerous prior art drivers combine a slotted-head and a cruciform-head, such as a Phillips-type screwdriver, onto a single shaft to enable the single, combination driver to engage both a screw having a single-slotted head and a screw having a Phillips-type head. Also, prior art combination drivers include configurations that mate with conventional hexagonal head fasteners, such as the combination driver disclosed in U.S. Pat. No. 4,367,664. Combination fasteners, such as hexagonal-head fasteners having a slot for a standard screw driver also are well-known.

For orthopedic or other surgeries in which threaded fasteners are affixed to part of a body, the fastener's head type and size are often recorded on an x-ray record of the body. Accordingly, in a subsequent surgery to remove or otherwise access the fasteners, the same x-ray record used for medical analysis identifies the proper type and size of driver to engage the fasteners. Sometimes, however, the subsequent surgery to remove or otherwise access the fasteners occurs without the use of the identifying information, such as when the information is not entered onto the original x-ray record or the original record is not available. Identifying the type and size of the fastener in order to choose the appropriate driver during surgery is otherwise difficult without open dissection because of the position of the fasteners in the body and because fluid may obscure the fastener.

SUMMARY

A combination driver is provided having alternating flutes and grooves. The driver is capable of engaging and driving a conventional hexagonal-head fastener and a conventional lobed-head fastener, such as a Torx®-type fastener. The driver includes a shaft defining a longitudinal axis and only one driving tip. The tip includes alternating flutes and crests. Each one of the flutes is curved in transverse cross section. Each one of the crests includes a first-side surface and an opposing second-side surface. Each one of the first-side surface and the second-side surface is substantially straight in transverse cross section. The flutes are capable of driving a fastener having a lobed recess and the crests are capable of driving another fastener having a straight-walled, hexagonal recess.

The crest first-side surfaces and the crest second-side surfaces may be planar or arcuate in longitudinal profile. In transverse cross-section, the crest first-side surfaces and the crest second-side surfaces may be straight or other configuration. Preferably, each one of the crest first-side surfaces and the crest second-side surfaces form an angle of approximately 120 degrees therebetween. The crest first-side surfaces and crest second-side surfaces may meet at a point in transverse cross section, or a junction portion may be disposed between the crest first-side surfaces and crest second-side surfaces. The junction portion may be flat or curved in transverse cross section.

The tip of the driver may be straight such that the tip does not have a taper, or may taper such that the width of the tip decreases proximate its distal end or such that the width of the tip increases proximate its distal end.

A socket-head driver is provided that includes a shaft defining a longitudinal axis and only one driving tip. The tip includes alternating flutes and crests. Each one of the flutes is curved in transverse cross section. Each one of the crests includes a first-side surface and an-opposing second-side surface, each of which is substantially straight in transverse cross section. The flutes are capable of driving a fastener having a hexagonal-head and at least one of the flutes and the crests is capable of driving another fastener having a lobed head.

A combination of the combination driver and conventional fasteners is also provided. The combination has a first configuration in which the driver engages a conventional straight-walled, hexagonal-head fastener and a second configuration in which the driver engages a conventional lobed-head fastener, such as a Torx® fastener. In the first configuration, at least a portion of the driver's crests engage walls of the hexagonal-head during for driving. In the second configuration, at least a portion of the driver's flutes engage lobes of the fastener during driving.

A threaded fastener is provided that is capable of being driven by each one of a conventional hexagonal-head socket driver and a conventional lobed-head socket driver. The fastener includes a head having alternating flutes and crests disposed about its perimeter. Each one of the flutes is curved in transverse cross section. Each one of the crests includes a first-side surface and an opposing second-side surface, each of which is substantially straight in transverse cross section. A shaft having screw threads protrudes from an underside of the head. The flutes are capable of being driven by a lobed-head socket driver and the crests are capable of being driven by a straight-walled, hexagonal-head socket driver.

A combination socket-head fastener is provided that is capable of being driven by each one of a hexagonal-head driver and a lobed-head driver. The fastener includes a head having a recess formed therein. The includes alternating flutes and sidewall surfaces. Each one of the flutes is curved in transverse cross section. The sidewall surfaces are disposed between the flutes, each one of the sidewall surfaces includes a first-side surface and an opposing second-side surface, and each one of the first-side surface and the second side surface is substantially straight in transverse cross section.

The combination socket-head fastener may be configuration such the flutes divide each planar sidewall substantially in half such that the sidewall first and second surfaces form a 120 degree angle therebetween. Accordingly, the crests or apexes of a hexagonal head driver would engage the sidewalls. Alternatively, the flutes may take the place of crests of the hexagonal shape such that a center portion, spaced apart from the apexes, contacts the fastener sidewalls.

BRIEF DESCRIPTION OF THE FIGURES

FIG. 1 is a perspective view illustrating the engagement of a driver with a first fastener;

FIG. 2 is a perspective view illustrating engagement of the driver shown in FIG. 1 with a second fastener;

DETAILED DESCRIPTION OF PREFERRED EMBODIMENTS

Figure 3:
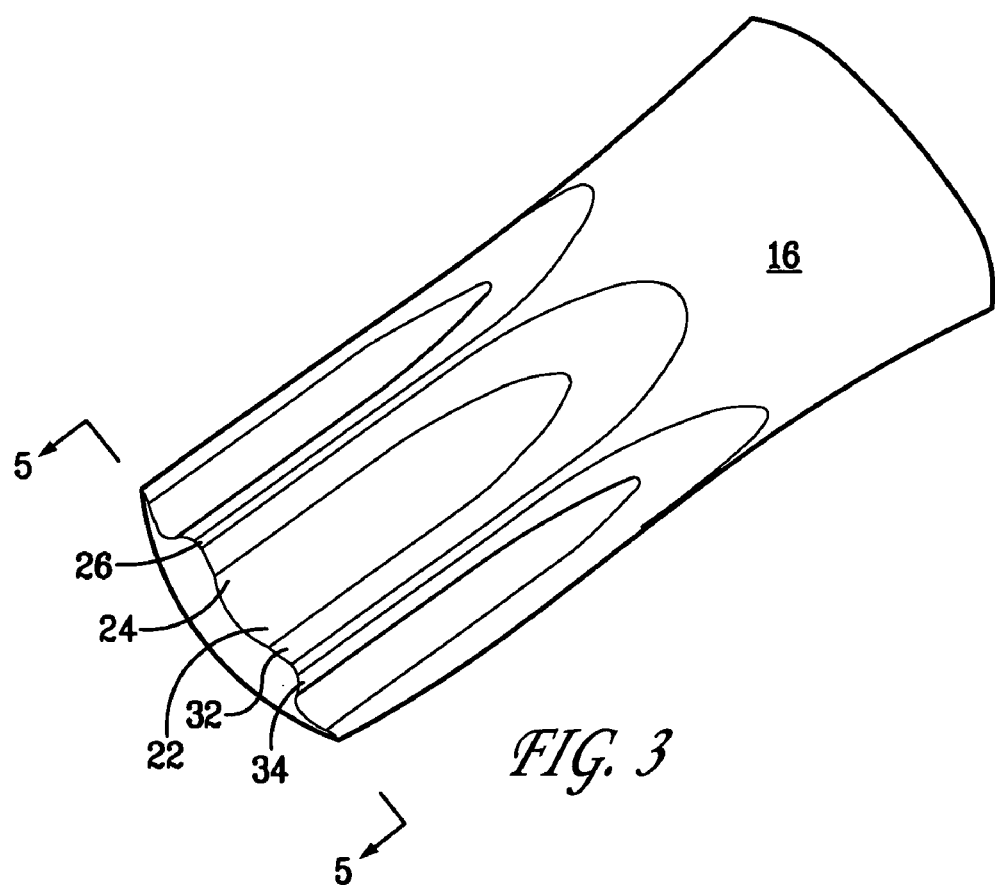
FIG. 3 is a perspective view of a tip of the driver shown in FIGS. 1 and 2.

A combination driver 10 includes a handle 12, a shaft 14, and a tip 16 capable of engaging and driving each one of a conventional lobed-head fastener 100 and a conventional hex-head fastener 200, as shown in FIGS. 1 and 2, respectively. Handle 12 is shown schematically in FIG. 1 to indicate that driver 10 may include any configuration or type of handle, and the present invention encompasses omitting a handle.

Figure 4:
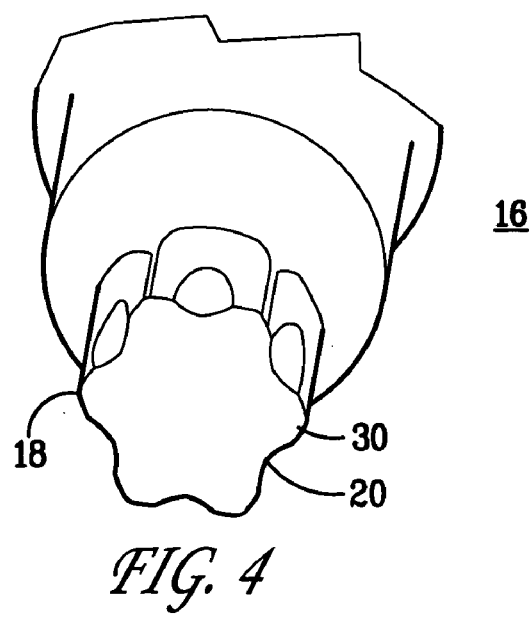
FIG. 4 is another perspective view of the tip of the driver shown in FIGS. 1 and 2.

Tip 16, which extends from shaft 14 and terminates in a terminal or distal end 18, has a configuration that enables it to be inserted into lobed-head fastener 100 and into hex-head fastener 200. Referring to FIG. 3 and FIG. 4, which show perspective views of tip 16, and FIG. 5, which shows a transverse cross sectional view of tip 16 near the distal end 18 thereof, tip 16 includes alternating flutes 20 and crests 30 formed about its perimeter.

Figure 5:
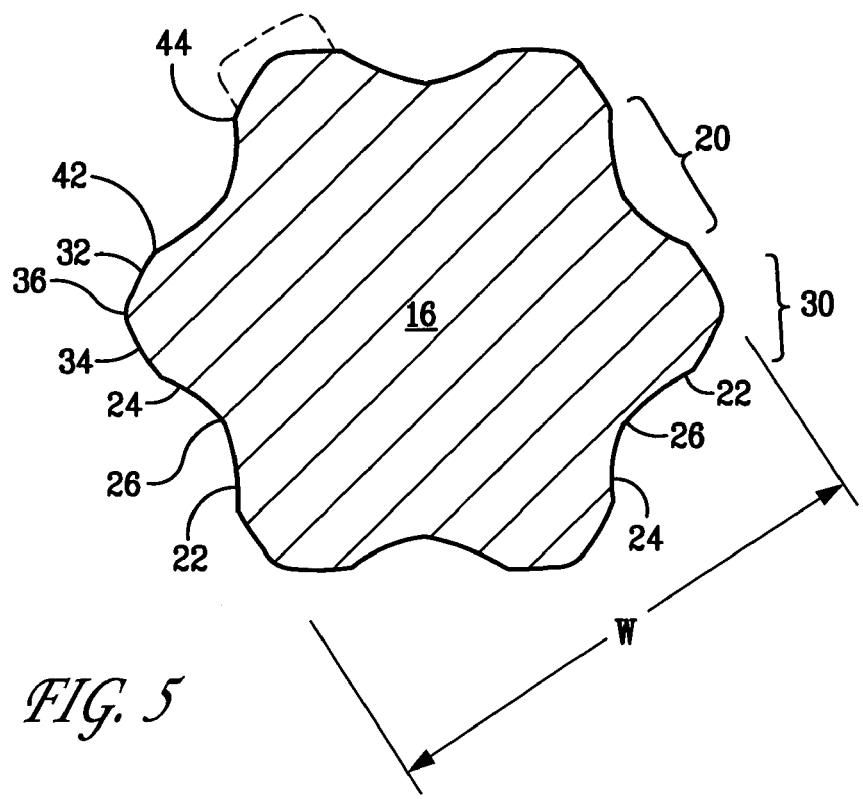
FIG. 5 is a cross-sectional view of the driver tip taken along lines 5—5 of FIG. 3.

In general, the shape of flutes 20 shown in FIGS. 3, 4, and 5 preferably is the same as the flutes of a conventional lobed-head driver such that flutes 20 engage the lobes of conventional fastener 100, as described more fully below. The shape of crests 30 is achieved by truncating a lobed-head such that crests 30 are configured to engage conventional, commercial hexagonal-head fasteners. For illustration, FIG. 5 shows a portion of a conventional Torx® profile in dashed lines that protrude from crest 30. In this regard, U.S. Pat. Nos. 3,584,667; 4,269,246; and 5,279,190 disclose lobed-head drivers and fasteners, and each is incorporated herein by reference in its entirety.

The particular embodiment of the driver shown in FIG. 5 is based on a Torx® T25 profile to enable driver 10 to engage a T25 size Torx® fastener. The configuration of crests 30, formed upon removal of a portion of the lobe, enables driver 10 to engage a conventional 3.5 mm hexagonal-head fastener. The present invention is not limited to any particular size. Rather, the present invention encompasses any size Torx® fastener sizes and corresponding hexagonal-head fastener. Further, the present invention is not limited to orthopedic or other surgical applications, but rather encompasses any use to which the driver may be employed.

Referring again to the embodiment shown in FIG. 5, each flute 20 has a curved profile, in transverse cross section, that includes a flute first-side portion 22 and an opposing flute second-side portion 24. Between flute first and second-side portions 22 and 24, there is a flute bottom 26. Each crest 30 includes a crest first-side surface 32 and an opposing crest second-side surface 34. Preferably, crest first and second-side surfaces 32 and 34 are planar. A junction portion 36 is disposed between crest first and second side surfaces 32 and 34. An included angle between side surfaces 32 and 34 is approximately 120 degrees. Junction portion 36 preferably is a small segment of a circle, but may be any configuration, as discussed in more detail below with respect to FIGS. 8B and 8C.

Preferably, each one of side surfaces 32 and 34 is parallel to a longitudinal axis of driver 10 for a suitable distance to enable the driver 10 to engage the desired fastener. Referring to FIG. 1, the distance D for which side surfaces 32 and 34 are parallel to longitudinal axis L can be 4.5 mm. Accordingly, the width W, shown in FIG. 5, across the tip from one planar face (32, 34) to another is constant through the distance D. Above the portion identified as within distance D, the surface of tip 16 gradually merges into the circular shape of shaft 14 above the portion of surfaces 32 and 34 that are planar. The present invention is not limited to any dimension D, width W, configuration of merging of surfaces 32 and 34 into shaft 14, or any other dimensions or configurations that are not expressly set forth in the claims.

Further, the present invention is not limited to crest sides 32 and 34 that are parallel to longitudinal axis L, but rather encompasses side surfaces that are curved in longitudinal profile, as explained more fully below with respect to FIGS. 9B and 9D. Also, the present invention encompasses crest side surfaces that are slightly arcuate, in transverse cross section. Accordingly, the terms "substantially planar" for three-dimensions or "substantially straight" for two dimensions (in transverse cross section) are employed herein to encompass not only a plane surface or straight line (in transverse cross section), respectively, but also to encompass crest surfaces that are or have a portion that is slightly arcuate. A designer may employ a somewhat arcuate crest surface because of design or manufacturing convenience, operational considerations, or the like. The limiting factor of the scope of meaning of "substantially planar" and "substantially straight" (in transverse cross section) is the ability of the driver to engage straight walls of a conventional hexagonal-head recess.

A first side transition 42 is disposed between crest first side surface 32 and flute first side surface 22. And a second side transition 44 is disposed between crest second-side surface 34 and flute second-side surface 24. Transitions 42 and 44, in transverse cross section, are the points or regions at which the arcuate flute 20 meets or blends into the straight surface of the crest 30.

Figure 6:
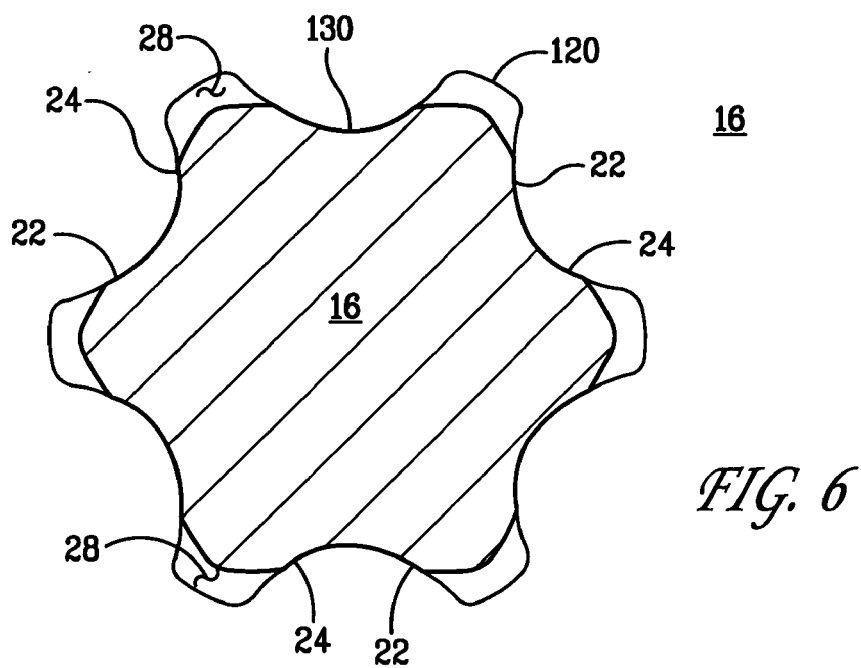
FIG. 6 is a schematic view of the cross-sectional profile of the driver shown in FIG. 5 disposed in a fastener head like that shown in FIG. 1.

Referring to FIG. 1 and FIG. 6, conventional fastener 100 includes alternating flutes 120 and lobes 130. FIG. 6, which shows the profile of the opening in fastener 100, schematically illustrates the interaction of driver flutes 20 with the fastener lobes 130. In FIG. 1, the portions of lobes 130 that are contacted by flutes 20 of driver 10 are shown with cross-hatching. First side portion 22 of each flute 20 contacts the corresponding cross-hatched portion of fastener lobe 130 while driving the fastener 100 in a clockwise direction, which is the insertion direction for right-handed threads. Second side portion 24 of each flute 20 contacts the corresponding cross-hatched portion of fastener lobe 130 while driving the fastener 100 in a counterclockwise direction, which is the removal direction for right-handed threads. Crests 30 do not contact the interior surface of lobed-fastener 100 in this embodiment, even though the invention, of course, is not limited to such configuration, but rather encompasses a configuration (not shown in the figures) in which crests 30 are not spaced apart from or are in contact with the surface of fastener 100.

Figure 7:
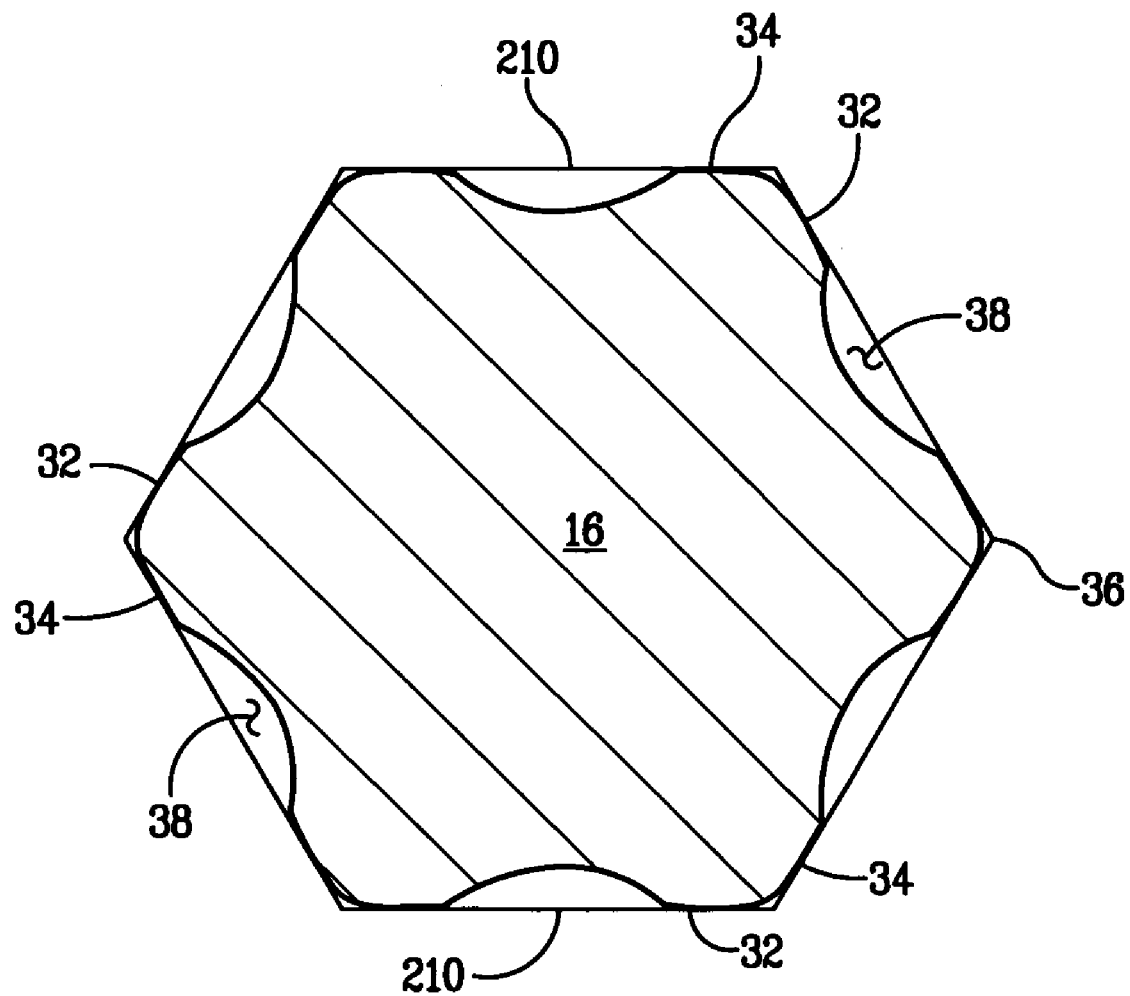
FIG. 7 is a schematic view of the cross-section of the driver shown in FIG. 5 disposed in a fastener head like that shown in FIG. 2.

Referring to FIG. 2 and FIG. 7, conventional fastener 200 includes six planar sidewalls 210, each of which preferably is parallel to a fastener longitudinal axis. FIG. 7, which shows the profile of the opening in fastener 200, schematically illustrates the interaction of crests 30 with hex-head opening sidewalls 210. In FIG. 2, sidewalls 210 of fastener 200 are shown in cross-hatching. Crest first side surface 32 contacts the corresponding portion of fastener wall 210 while driving the fastener 200 in a clockwise direction, which is the insertion direction for right-handed threads. Crest second side surface 34 contacts the corresponding portion of fastener wall 210 while driving fastener 200 in a counterclockwise direction, which is the removal direction for right-handed threads. Flutes 20 do not contact the interior surface of hex-head fastener 200 in this embodiment, even though the invention, of course, is not limited to configurations in which some or all portions of flutes 20 are spaced apart from fastener 200.

Figure 8A:
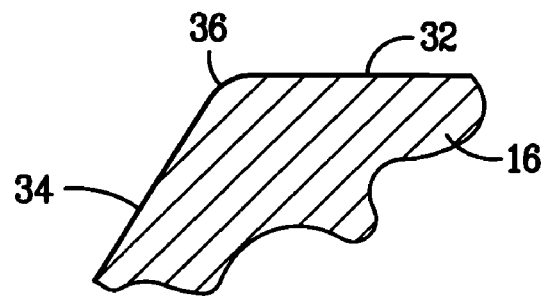
FIG. 8A is an enlarged, cross-sectional view of a portion of a crest of the driver shown in FIG. 5.
Figure 8B:
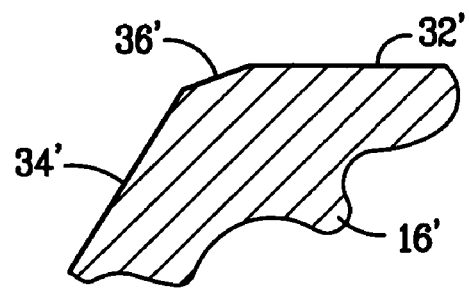
FIG. 8B is an enlarged, cross-sectional view of a portion of another embodiment of a crest of the driver.
Figure 8C:
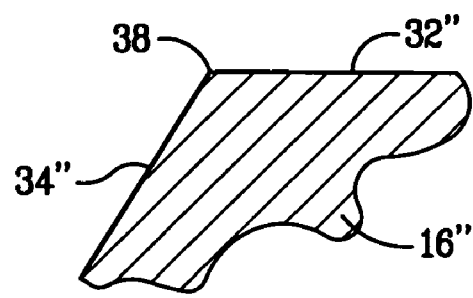
FIG. 8C is an enlarged, cross-sectional view of a portion of yet another embodiment of a crest of the driver.

FIGS. 8A, 8B, and 8C are enlarged views of embodiments of crests 30. In each embodiment, the included angle between the first and second sides is 120 degrees. As seen in FIG. 8A, which shows an enlarged view of crest 30 shown in FIGS. 1 through 7, junction portion 36, in transverse cross section, preferably is curved and preferably is a segment of a circle. As shown in FIG. 8B, junction portion 36' disposed between crest first and second side portions 32' and 34' preferably is flat in transverse cross section to form a chamfer. As shown in FIG. 8C, crest first and second side portions 32" and 34" meet at a point or apex 38.

FIGS. 9A, 9B, 9C, and 9D show alternative configurations of the driver tip. Each reference numeral in FIGS. 9A through 9D refers to structure that corresponds to structure of the embodiment of FIGS. 1 through 7, but each reference numeral in FIGS. 9A through 9D is appended with a letter designation to indicate that its structure is an alternative embodiment.

Figure 9A:
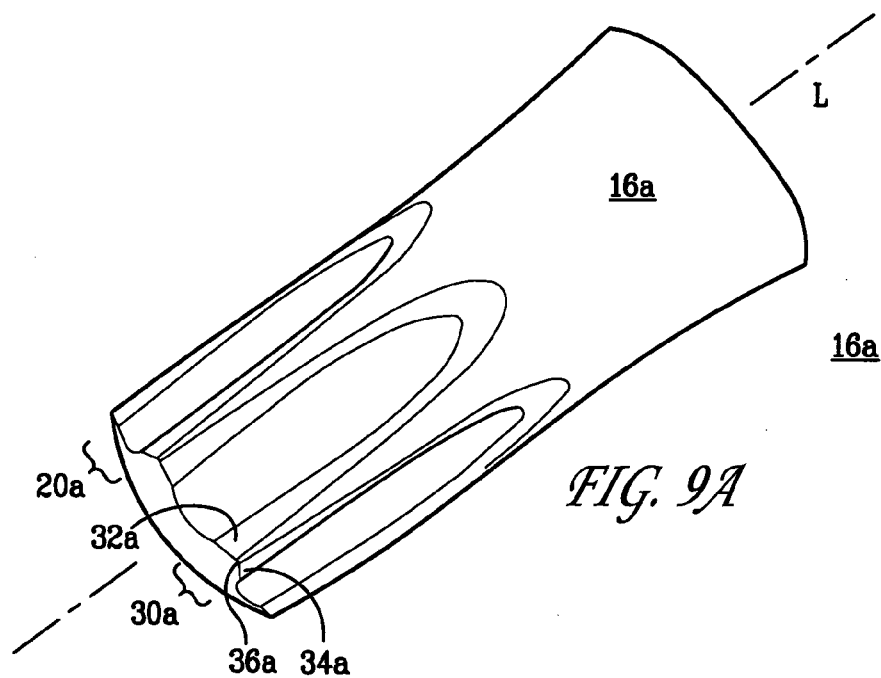
FIG. 9A is a perspective view of a tip of a second embodiment of the driver.

As shown in FIG. 9A, tip 16a includes crest first and second surfaces 32a and 34a that are planar and tapered. In this regard, the particular surfaces 32a and 34a that are shown in FIG. 9A, as well as other similarly disposed crest surfaces about the perimeter of tip 16a, define a plane that is inclined relative to axis L such that the distance from axis L to the plane formed by the crest surfaces 32a and 34a diminishes approaching the distal end 18a. Thus, the width between crest faces on opposite sides of tip 16a diminishes proximate its distal end 18a. The flutes may be parallel or arcuate in longitudinal profile. Opposite distal end 18a, crest surfaces 32a and 34a gradually merge into the cylindrical profile of shaft 14.

Figure 9B:
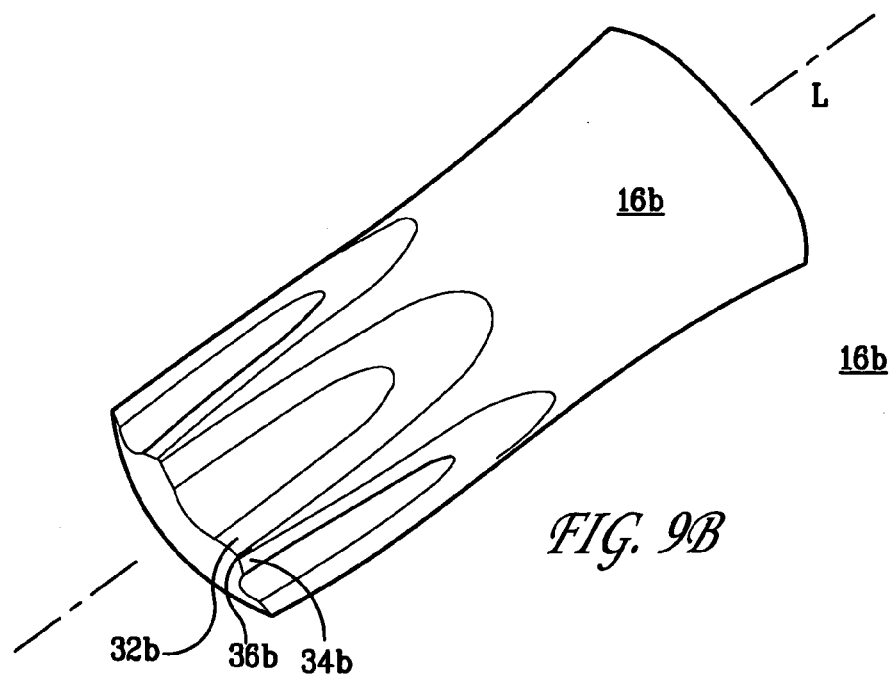
FIG. 9B is a perspective view of a tip of a third embodiment of the driver.

As shown in FIG. 9B, tip 16b includes crest first and second surfaces 32b and 34b that are tapered and curved in longitudinal profile. Preferably, and as can be seen in FIG. 9B, crest surfaces 32b and 34b are straight or substantially straight in transverse profile, which profile is not separately shown in the Figures. Accordingly, first and second crest surfaces 32b and 34b do not form a plane, but rather form a surface having a smoothly arced longitudinal profile such that the width between crest faces on opposite sides of tip 16b diminishes approaching its distal end 18b. Flutes 20b also may be tapered in longitudinal profile. Opposite distal end 18b, crest surfaces 32b and 34b gradually merge into the cylindrical profile of shaft 14.

Figure 9C:
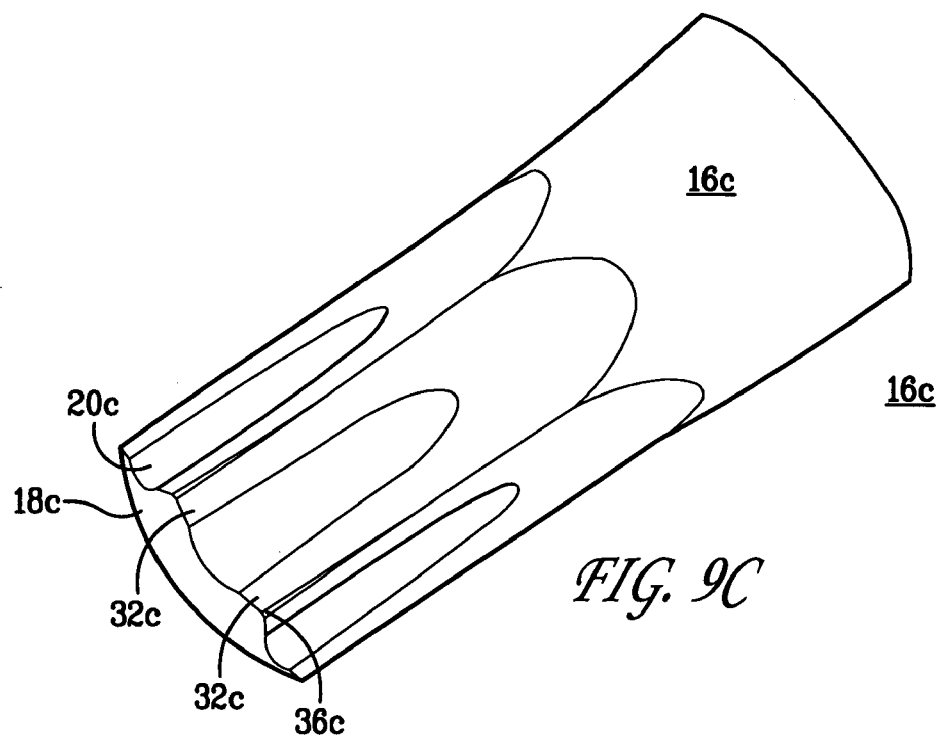
FIG. 9C is a perspective view of a tip of a fourth embodiment of the driver.

As shown in FIG. 9C, tip 16c includes crest first and second surfaces 32c and 34c that are planar and back-tapered or undercut. In this regard, the particular surfaces 32c and 34c that are shown in FIG. 9C, as well as other similarly disposed crest surfaces about the perimeter of tip 16c, define a plane that is inclined relative to axis L such that the distance from axis L to the plane formed by the crest surfaces 32c and 34c increases approaching the distal end 18c. Thus, the width between crest faces on opposite sides of tip 16c increases proximate its distal end 18a. Opposite distal end 18c, crest surfaces 32c and 34c merge into the cylindrical profile of shaft 14.

Figure 9D:
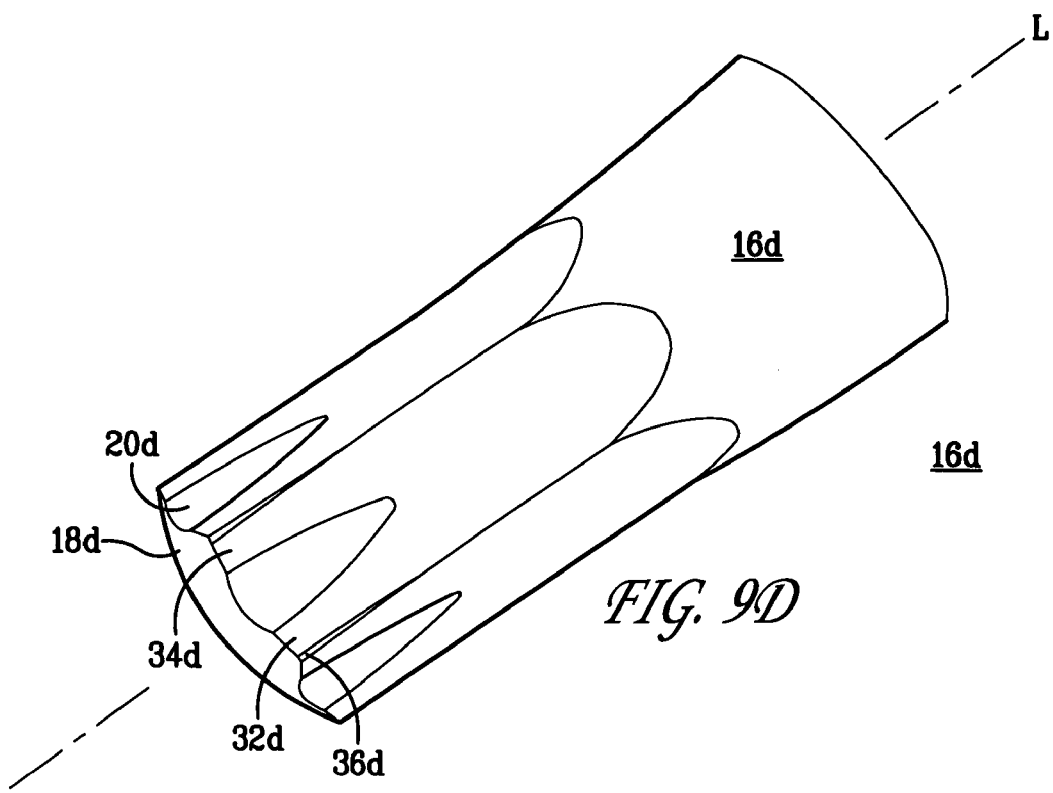
FIG. 9D is a perspective view of a tip of a fifth embodiment of the driver.

As shown in FIG. 9D, tip 16d includes crest first and second surfaces 32d and 34d that are back-tapered or undercut and curved in longitudinal profile. Preferably, and as can be seen in FIG. 9D, crest surfaces 32d and 34d are straight or substantially straight in longitudinal profile, which profile is not separately shown in the Figures. Accordingly, first and second surfaces 32d and 34d do not form a plane, but rather form a surface having a smoothly arced longitudinal profile such that the width between crest faces on opposite sides of tip 16d increases proximate its distal end 18b. Opposite distal end 18d, crest surfaces 32d and 34d merge into the cylindrical profile of shaft 14.

The maximum torque transmission rating of driver 10 having any of tips 16, 16a, 16b, 16c, and 16d, may be less than that of a conventional lobed-head driver when driving lobed-head fasteners. Similarly, the maximum torque transmission rating for any of the fasteners or socket type drivers disclosed herein may be less than the ratings of corresponding conventional lobed-head products. For many applications, however, such as in an orthopedic application, the torque transmission capability of the driver or the screw head is not the limiting factor in determining the maximum torque that can be applied safely. For example, in an orthopedic application, the risk of breaking a screw shaft, damaging bone, or like failure likely limits the maximum safe torque.

The configuration of driver 10, having any of the tips 16, 16a, 16b, 16c, or 16c, when disposed in either of fastener 100 or fastener 200 forms channels that enables fluid disposed in the fastener head to escape as driver 10 is inserted into the head 100 or 200. Referring to FIG. 6 for illustration, a space or channel 28 formed between driver crests 30 and fastener lobe 130 enables transmission of fluid in the bottom of the cavity of fastener 100. Referring to FIG. 7 for illustration, a space or channel 38 formed between driver flutes 30 and fastener walls 210 enables transmission of fluid in the bottom of the cavity of fastener 200.

Figure 10:
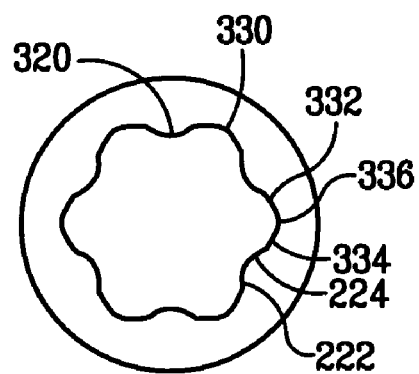
FIG. 10 is a plan view of a socket-type driver.

Referring to FIG. 10 to illustrate another configuration of a driver, socket-type driver 310 includes a socket-type tip 316 having alternating arcuate flutes 320 and crests 330 formed about the socket's perimeter, as well as a shaft and handle (not shown). The configuration of flutes 320 and crests 330 is as described with respect to FIGS. 1 through 7 such that flutes 320 and 330 are the negative of flutes 20 and crests 30. In this regard, flutes 320 include a flute first side portion 322 and flute second side portion 324. A flute bottom portion 326 is disposed between flute side portions 322 and 324.

Crests 330 preferably include a planar crest first surface 322 and a planar crest second surface 324 with a junction portion 336 or peak 338 formed between adjacent crest surfaces 322 and 324. Junction portion 336 or peak 338 can be any configuration, such as the negative of the structure shown in FIGS. 8A, 8B, or 8C. Crests 330 can have the negative of any structure disclosed herein with respect to tips 16, 16a, 16b, 16c, and/or 16d.

Figure 11:
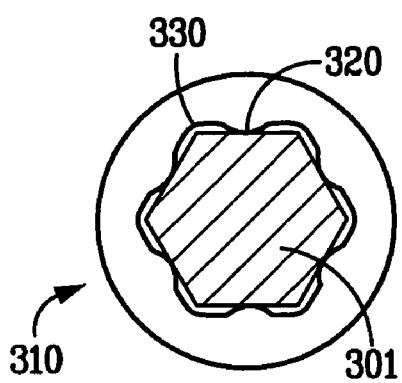
FIG. 11 is a plan view of the socket-type driver shown in FIG. 10 with a conventional hexagonal-head fastener, shown schematically, disposed therein.

FIG. 11 shows driver 310 engaged with a conventional hexagonal-head fastener, which head 301 is shown in cross-section. Flutes 320 engage the flats of the hex-head for driving the hex-head fastener. In particular, because flute bottom portions 326 are the radially innermost portions of the socket of driver 310, flute bottom portions 326 engage the flats of hex-head 301 during clockwise and counter-clockwise driving.

Figure 12:
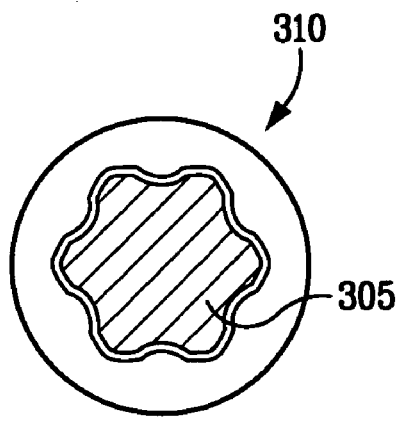
FIG. 12 is a plan view of the socket-type driver shown in FIG. 10 with a conventional lobed-head fastener, shown schematically, disposed therein.

FIG. 12 shows driver 310 engaged with a conventional lobed-head fastener, such as a Torx®-style fastener, the head 305 of which is shown in cross section. Depending on the particular dimensions of the fastener head 305 and driver 310, the lobed of head 305 may be engaged by the flute side portions 322 or 324 or the crest side surfaces 332 or 334, as will be understood by persons familiar with fastener and driver technology and according to the particular configuration of the conventional lobed fastener.

Figure 13:
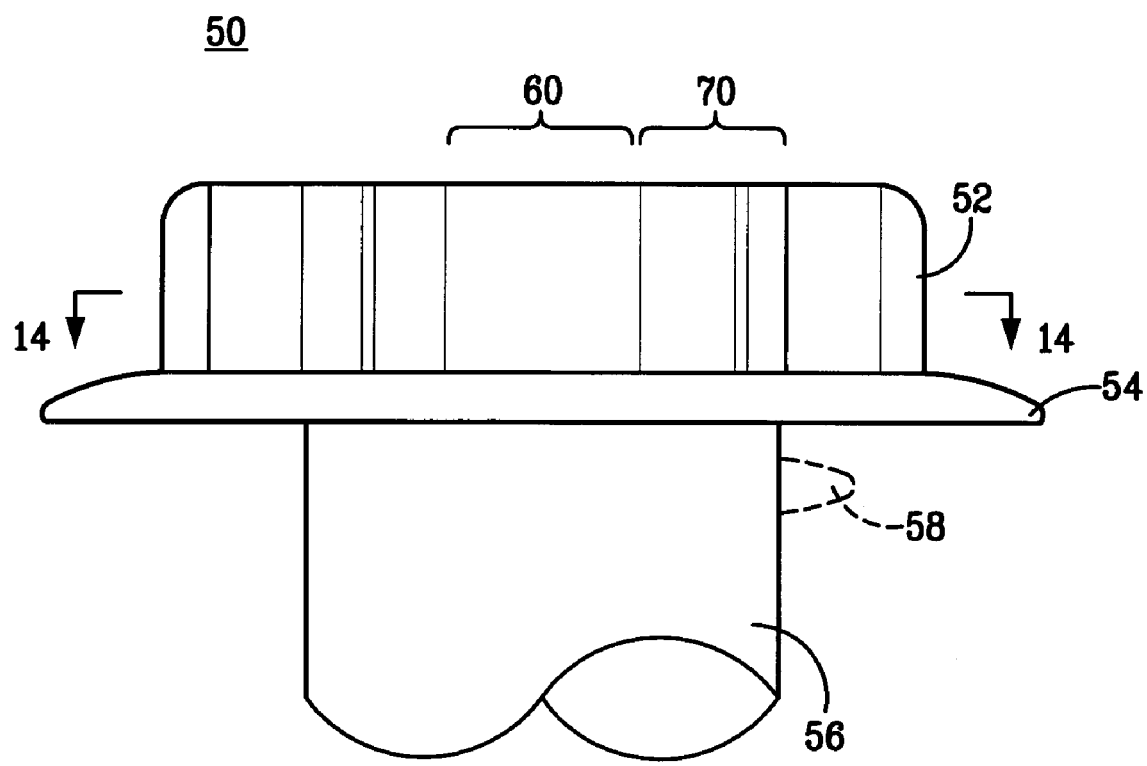
FIG. 13 is a side view of a fastener suitable for being driven by either a socket-type hexagonal head driver or a socket-type lobed head driver.

Referring to FIG. 13, a fastener 50 includes a head 52, a flange 54, and a shaft 56. Flange 54, which is optional, extends radially outwardly from a lowermost portion of head 52 and may reduce the bearing pressure of the screw head against its work-piece. Shaft 56, which preferably is conventional, includes threads 58 disposed thereon. Threads 58 are shown in relief in FIG. 13 to indicate that the threads can be of any configuration.

Figure 14:
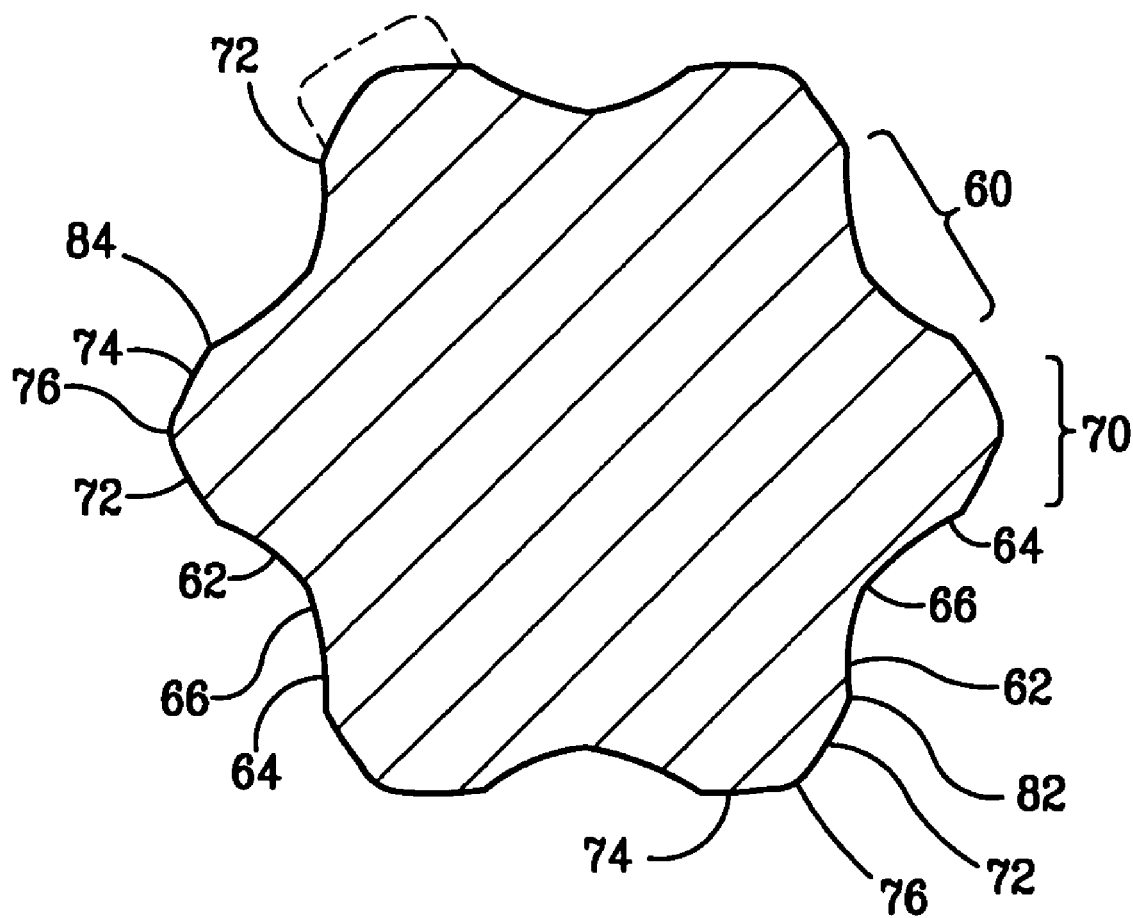
FIG. 14 is a transverse cross-sectional view of the fastener of FIG. 13 taken through lines 14—14 in FIG. 13.

As best shown in FIG. 14, which shows a transverse cross section through lines 14—14 in FIG. 13 with flange 54 omitted for clarity, head 50 includes alternating flutes 60 and crests 70 formed about its perimeter. In general, the shape of flutes 60 shown in FIG. 13 and FIG. 14 preferably is the generally same as the flutes of a conventional lobed-head fastener, such as a conventional Torx® fastener, such that the lobes of a conventional socket-type driver engage flutes 60.

The shape of fastener crests 70 is achieved by truncating a lobed-head such that the flat walls of a conventional hexagonal socket-type driver engage crests 70. For illustration, FIG. 14 shows a portion of a conventional Torx® profile in dashed lines that protrude from crest 30.

Each flute 60 has a curved profile, in transverse cross section, that includes a flute first-side portion 62 and an opposing flute second-side portion 64. Between flute first and second-side portions 62 and 64, there is a flute bottom 66. Each crest 70 includes a crest first-side surface 72 and an opposing crest second-side surface 74. Preferably, crest first and second-side surfaces 72 and 74 are planar. A junction portion 76 is disposed between crest first and second side surfaces 72 and 74. An included angle between side surfaces 72 and 74 is approximately 120 degrees. Junction portion 76 preferably is a small segment of a circle, but may be any configuration, as discussed above with respect to FIGS. 8B and 8C.

Preferably, each one of side surfaces 72 and 74 is parallel to a longitudinal axis of fastener 50. The present invention is not limited such configuration of surfaces 72 and 74, but rather encompasses any configuration as will be understood by persons familiar with fastener technology in view of the present disclosure. As described below, the configuration of fastener 50 enables it to be engaged and driven by each of a conventional lobed-head socket-type driver, such as driver 150 illustrated in FIG. 15, and a conventional hexagonal-head socket-type driver, such as driver 250 illustrated in FIG. 16.

Figure 15:
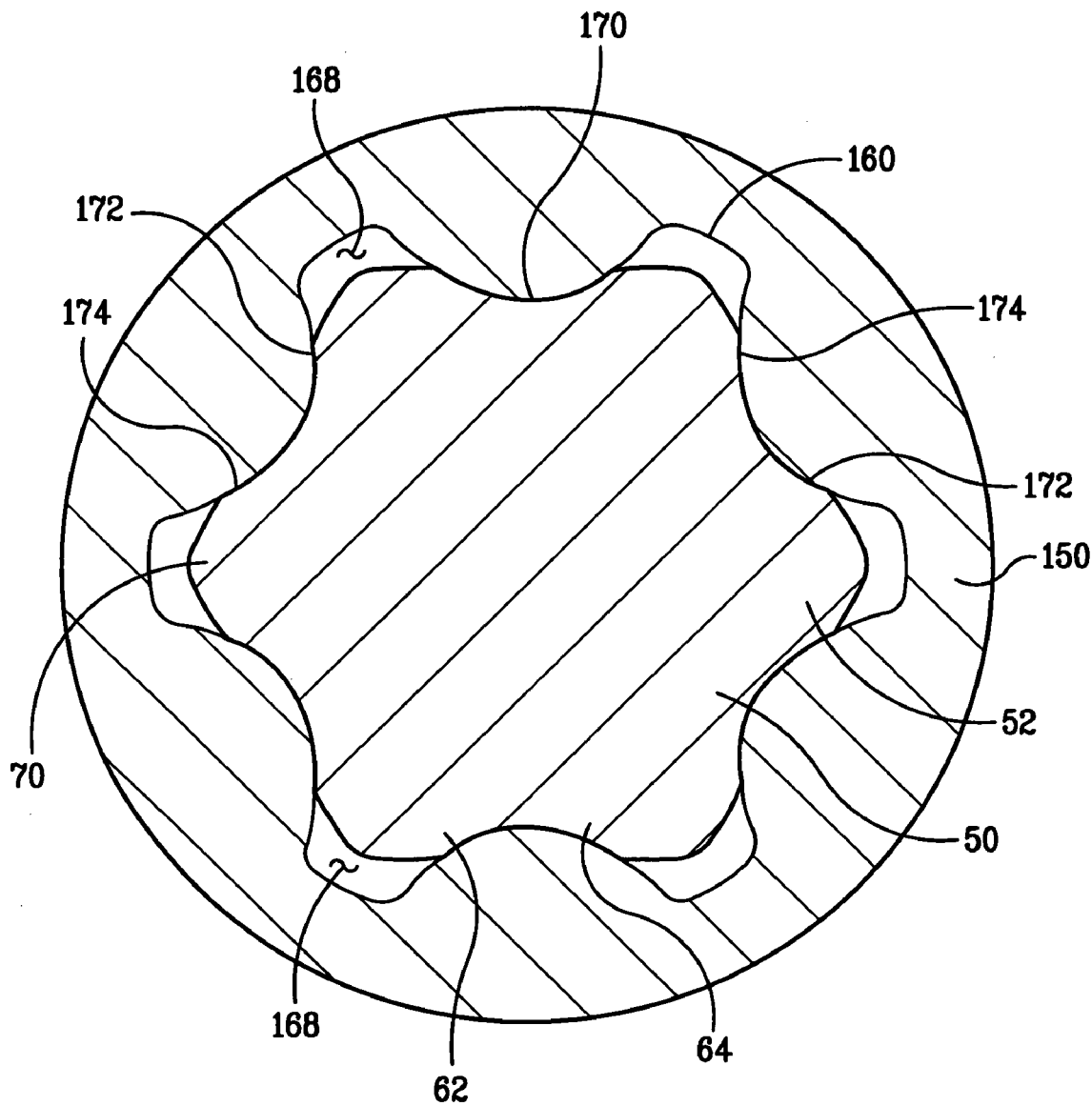
FIG. 15 is a cross sectional view of the fastener of FIG. 13 being engaged by a first type of driver.

FIG. 15 schematically shows a cross section through fastener head 52 and a conventional lobed-head socket-type driver 150 that includes alternating flutes 160 and lobes 170. First side portion 62 of each flute 60 is contacted by the corresponding first side portion 172 of driver lobe 170 while driving the fastener 50 in a clockwise direction, which is the insertion direction for right-handed threads. Second side portion 64 of each flute 60 is contacted by the corresponding second side portion 174 of driver lobe 170 while driving the fastener 50 in a counterclockwise direction, which is the removal direction for right-handed threads. Driver flutes 160 do not contact fastener crests 70 in the embodiment shown in FIG. 15 such that a space or channel 168 is formed between fastener crests 70 and driver flute 160, which enables transmission of fluid therein. The invention, of course, is not limited to such configuration, but rather encompasses a configuration (not shown in the figures) in which crests 70 are not spaced apart from or are in contact with the surface of driver 150.

Figure 16:
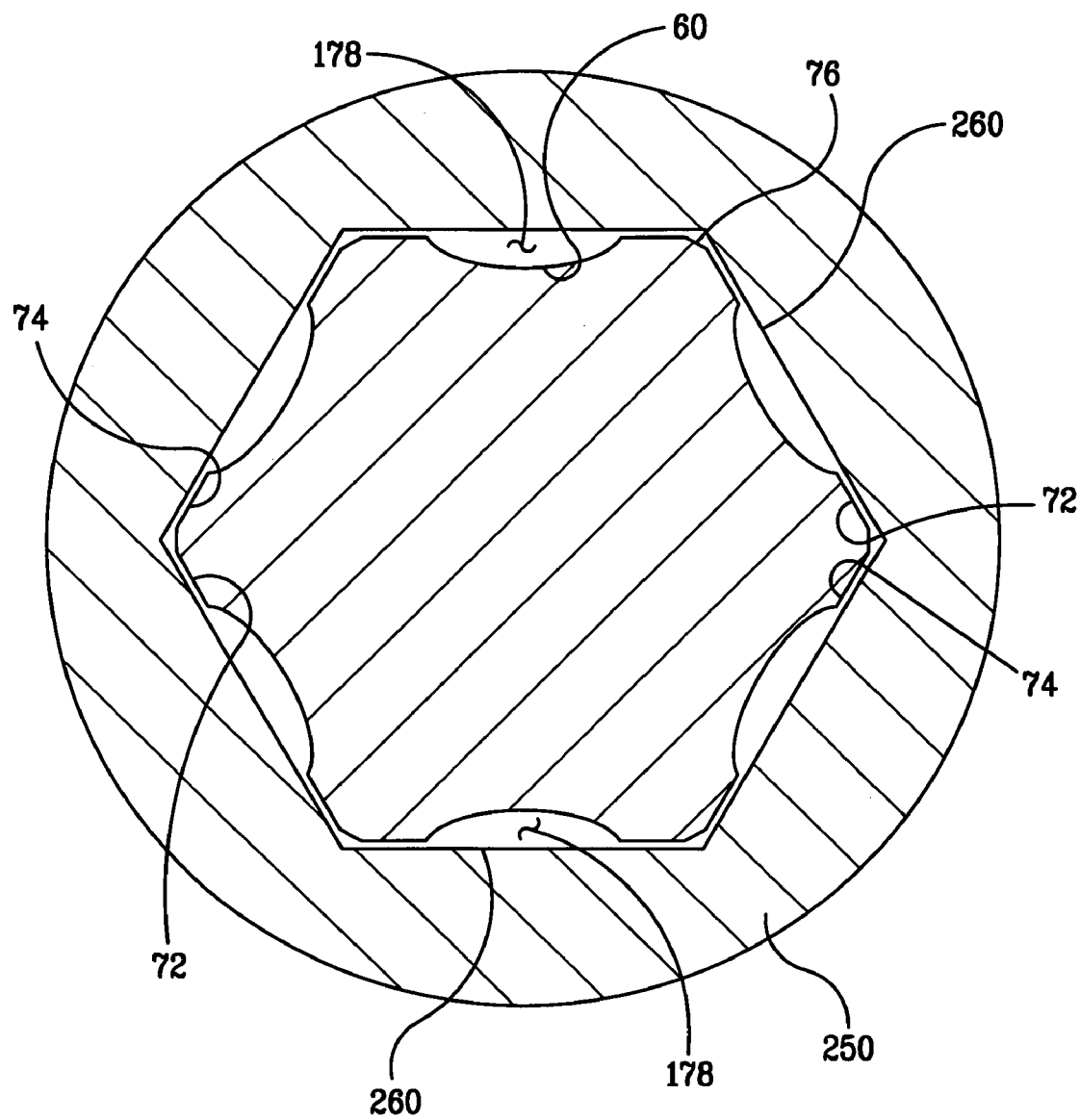
FIG. 16 is a cross sectional view of the fastener of FIG. 13 being engaged by a second type of driver.

FIG. 16 schematically shows a cross section taken through fastener head 50 and a conventional hexagonal-head socket-type driver 250 that includes six planar sidewalls 260, each of which preferably is parallel to a driver longitudinal axis. Fastener crest first side surface 72 in contacted by the corresponding portion of driver wall 260 while driving the fastener 50 in a clockwise direction, which is the insertion direction for right-handed threads. Fastener crest second side surface 74 is contacted by the corresponding portion of driver wall 260 while driving fastener 50 in a counterclockwise direction, which is the removal direction for right-handed threads. Driver wall 260 does not contact the fastener flute 60 such that a space or channel 178 formed between fastener flute 60 and driver sidewall 260 to enable fluid transmission therein. The present invention, however, is not limited to configurations in which some or all portions of flutes 20 are spaced apart from fastener 200.

The particular embodiment of the fastener 50 shown in FIG. 15 and FIG. 16 is based on a Torx® T25 fastener. The configuration of crests 70, formed upon removal of a portion of the lobe, enables fastener 50 to be engaged by a conventional 3.5 mm hexagonal-head socket-type driver 250, as described above. The present invention is not limited to any particular size, but rather the present invention encompasses any size Torx® fastener sizes and corresponding hexagonal-head fastener. Further, the present invention is not limited to orthopedic or other surgical applications, but rather encompasses any use to which the fastener 50 may be employed.

The maximum torque rating of fastener 50 may be less than that of a conventional lobed-head fasteners. For many applications, however, such as in an orthopedic application, the torque rating of the fastener head is not the limiting factor in determining the maximum torque that can be applied safely to a transmitted. For example, in an orthopedic application, the risk of breaking a screw shaft, damaging bone, or like failure likely limits the maximum safe torque.

Figure 17A:
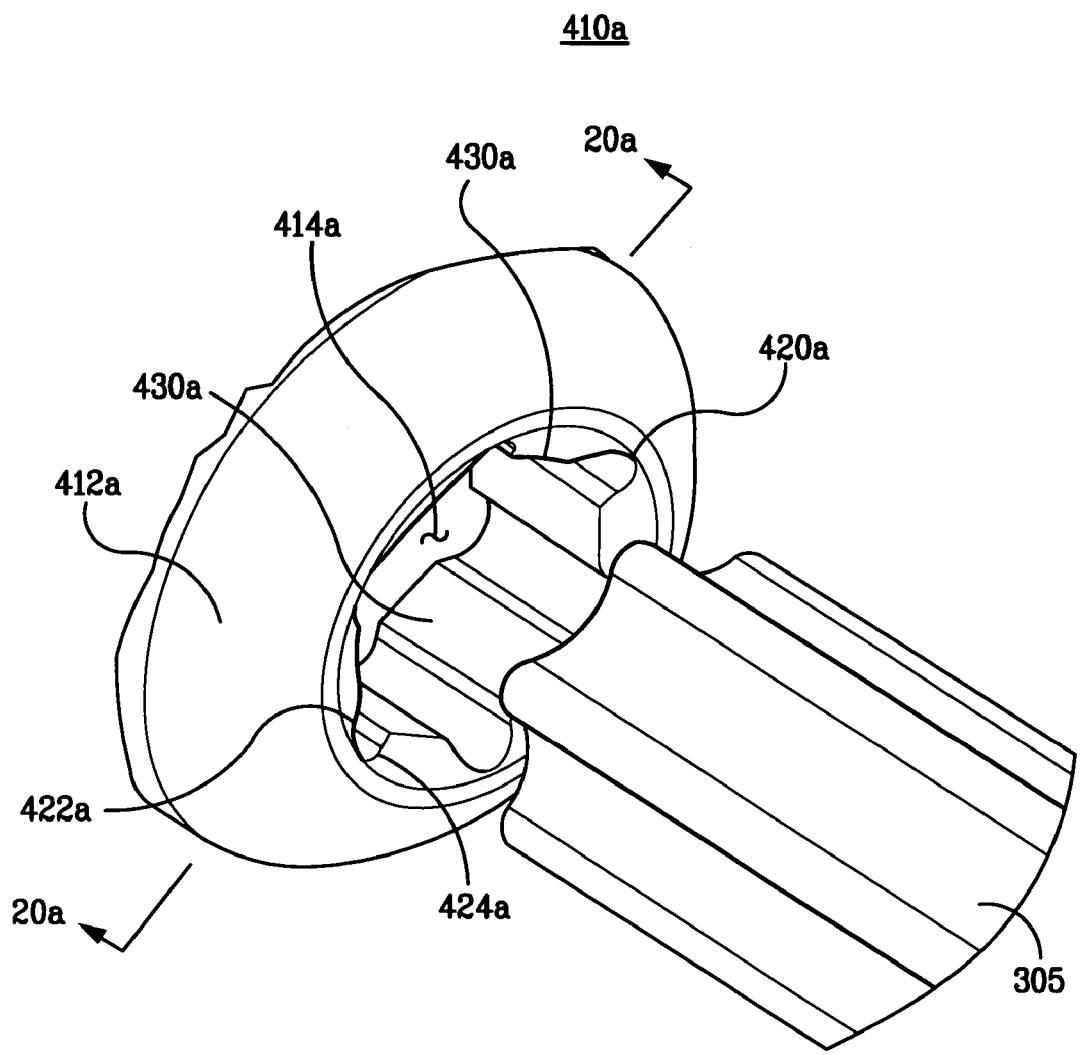
FIG. 17A is a perspective view illustrating the engagement of a lobed head driver with an embodiment of a socket-type fastener.
Figure 18A:
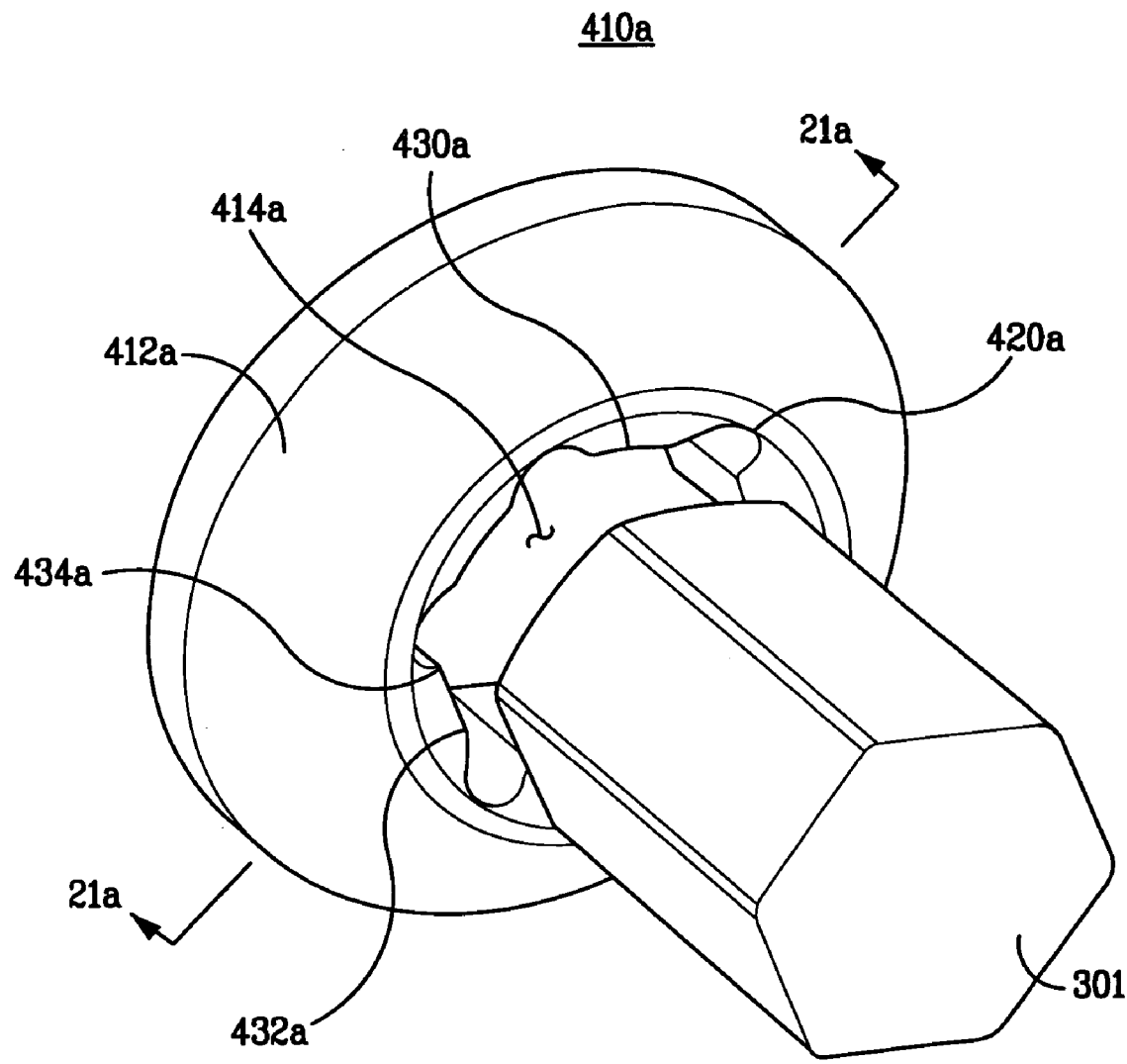
FIG. 18A is a perspective view illustrating engagement of a hexagonal head driver with the fastener shown in FIG. 17A.

A combination socket-type fastener 410a can be engaged and driven by each of a conventional lobed-head driver, such as driver 305 illustrated in FIG. 17A, and a conventional hexagonal-head driver, such as driver 301 illustrated in FIG. 18A.

Figure 19A:
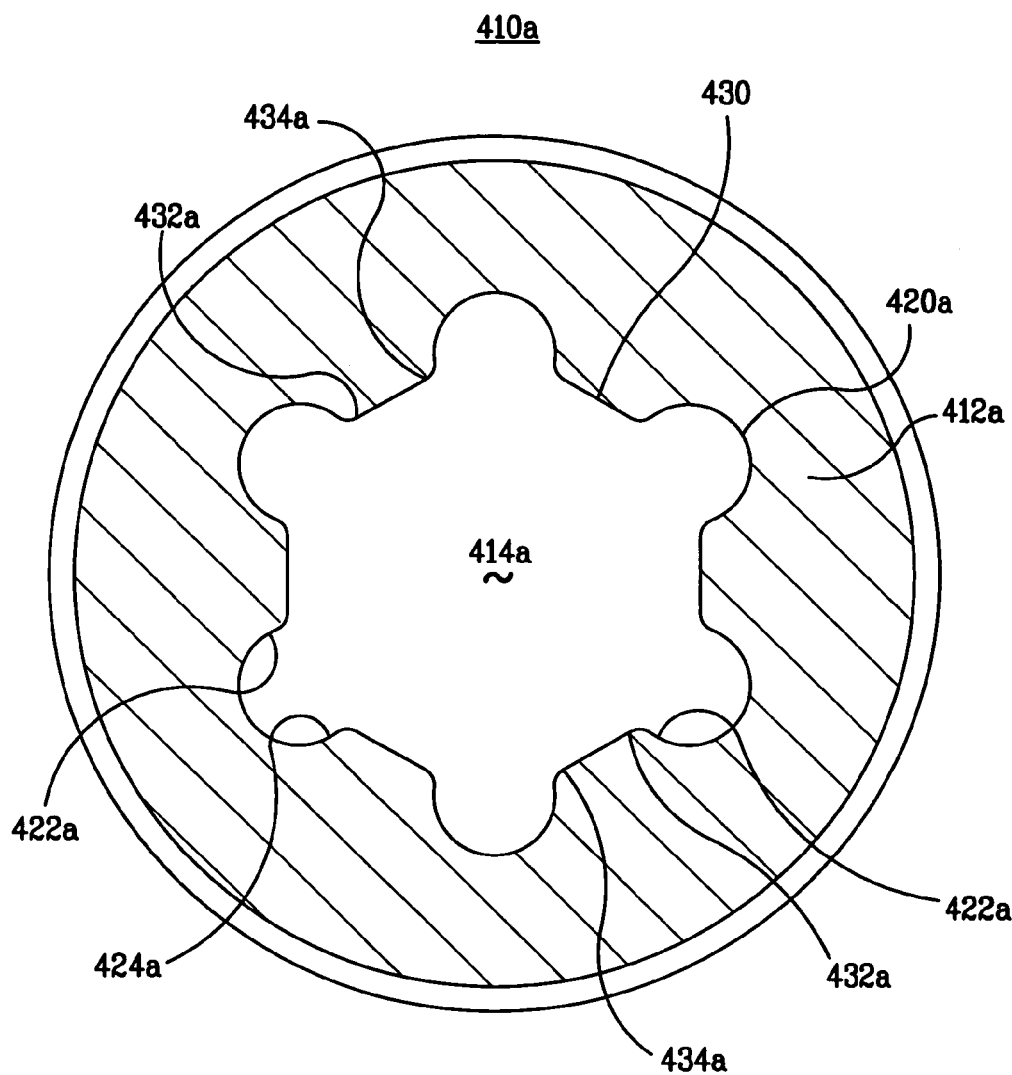
FIG. 19A is a transverse cross-sectional view of the fastener of FIG. 17A.

As best shown in FIG. 19A, which shows a transverse cross section of a head portion of faster 410a, a head 412a has a socket or recess 414a formed therein that includes alternating flutes 420a and planar sidewalls 430a formed about its perimeter. In general, the shape of flutes 420a shown in FIG. 19A preferably is generally same as the flutes of a conventional lobed-head fastener, such that the lobes of a conventional lobed-head driver engage flutes 420a.

Also, in general, the shape of planar sidewalls 430A shown in FIG. 19A preferably is generally same as the planar sidewalls of a conventional hexagonal-head fastener, such that the planar sidewalls of a conventional hexagonal-head driver engage planar sidewalls 430a. Each flute 420a includes a flute first side portion 422a and an opposing flute second side portion 424a. Each planar sidewall 430a includes a planar sidewall first side portion 432a and an opposing planar sidewall second side portion 434a.

Preferably, each one of sidewall surfaces 432a and 434a are parallel to a longitudinal axis of fastener 410a. The present invention is not limited to such configuration of sidewall surfaces 432a and 434a, rather it encompasses any configuration as will be understood by persons familiar with fastener technology in view of the present disclosure. As described below, the configuration of fastener 410a enables it to be engaged and driven by each of a conventional lobed-head driver, such as driver 305 illustrated in FIG. 17a, and a conventional hexagonal-head driver, such as driver 301 illustrated in FIG. 18A.

Figure 20A:
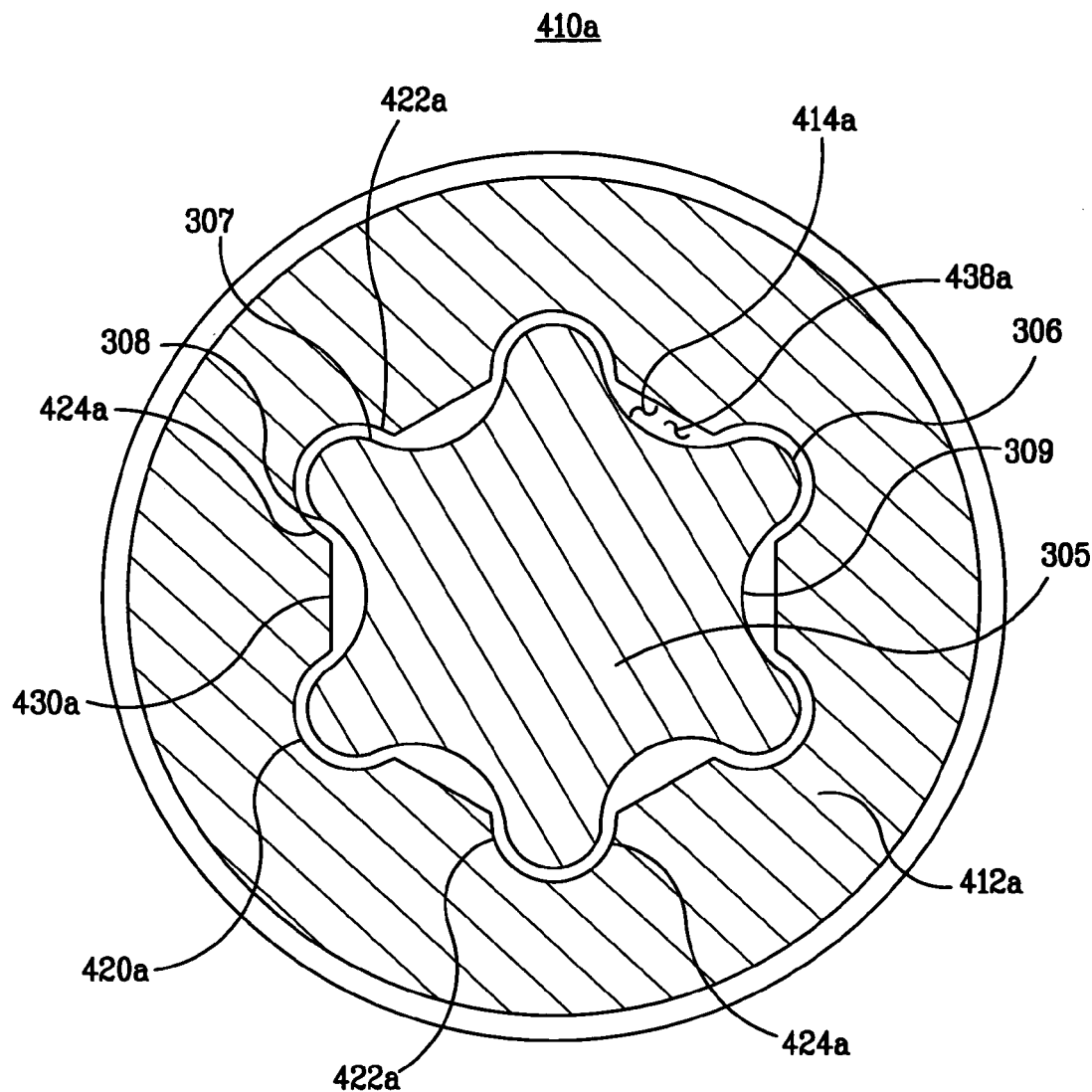
FIG. 20A is a cross sectional view of the fastener and engaged driver shown in FIG. 17A taken through lines 20A—20A.

FIG. 20A shows a cross section through fastener head 412a and a conventional lobed-head driver 305 that includes alternating lobes 306 and flutes 309. First side portion 422a of each flute 420a is contacted by the corresponding first side portion 307 of driver lobe 306 while driving fastener 410a in a clockwise direction, which is the insertion direction for right handed threads. Second side portion 424a of each flute 420a is contacted by the corresponding second side portion 308 of driver lobe 306 while driving fastener 410a in a counter clockwise direction, which is the removal direction for right-handed threads. Driver flutes 309 do not contact fastener planar sidewalls 430a in the embodiment shown in FIG. 20A such that a space or channel 438a is formed between fastener sidewalls 430a and driver flutes 309, which enables transmission of fluid therein. The invention, of course, is not limited to such configuration, but rather encompasses a configuration (not shown in the figures) in which driver flutes 309 contact a portion of fastener 410a.

Figure 21A:
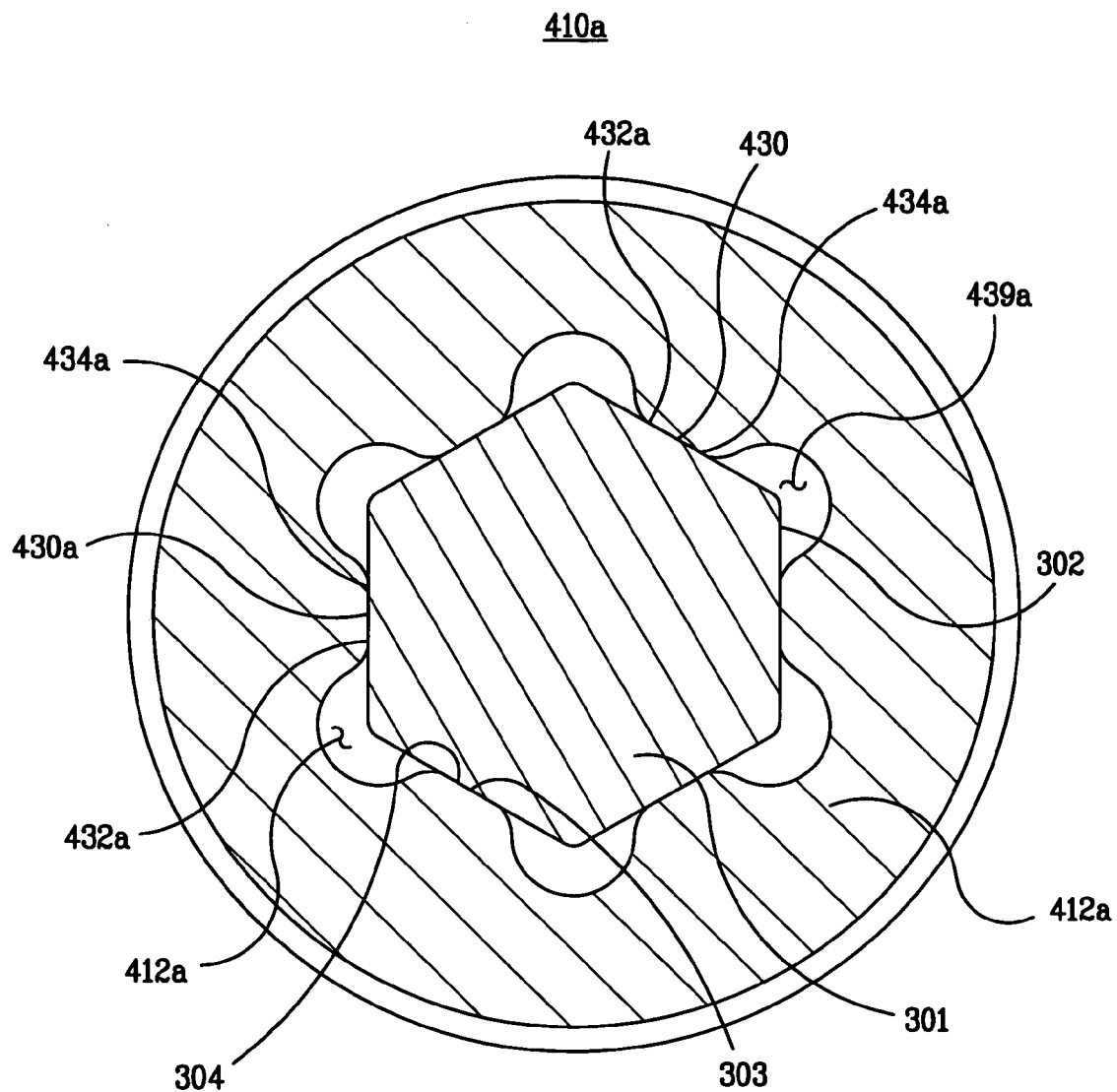
FIG. 21A is a cross sectional view of the fastener and engaged driver shown in FIG. 18A taken through lines 21A—21A.

FIG. 21A shows a cross section taken through fastener head 412a and a conventional hexagonal-head driver 301 that includes six planar sidewalls 302, each of which preferably is parallel to a driver longitudinal axis. Fastener planar sidewall first side portion 432a is contacted by the corresponding sidewall surface 303 of driver sidewall 302 while driving fastener 410a in a clockwise direction, which is the insertion direction for right-handed threads. Fastener planar sidewall second side portion 434a is contacted by the corresponding sidewall surface 303 of driver sidewall 302 while driving fastener 410a in a counterclockwise direction, which is the removal direction for right-handed threads. Neither driver sidewall 302 nor the crest or apex of driver 301 between the sidewalls 302 contact fastener flutes 420a such that a space or channel 439a forms between fastener flute 420a and driver 301 to enable fluid transmission therein.

Figure 17B:
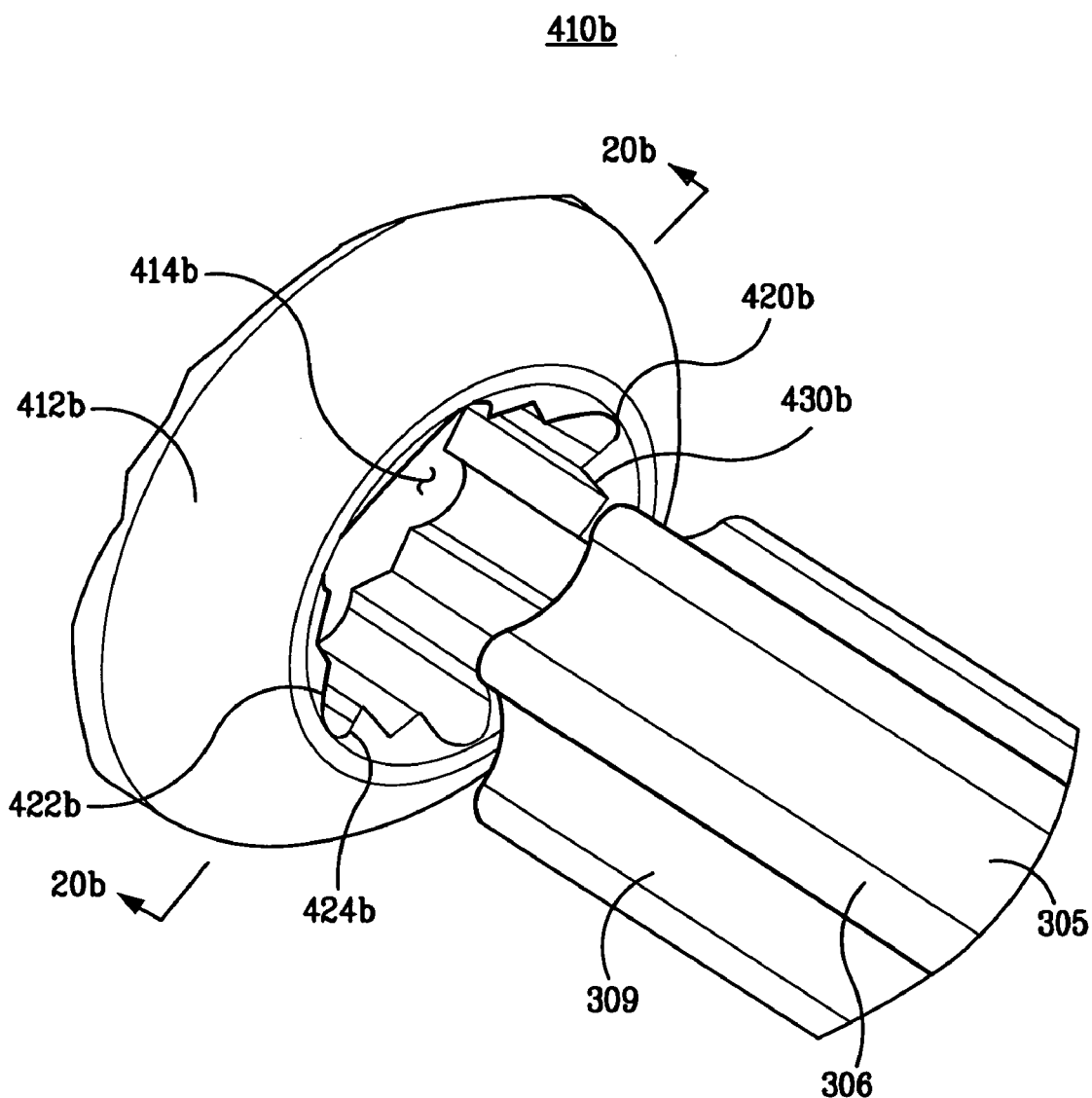
FIG. 17B is a perspective view illustrating the engagement of a lobed head driver with another embodiment of a socket-type fastener.
Figure 18B:
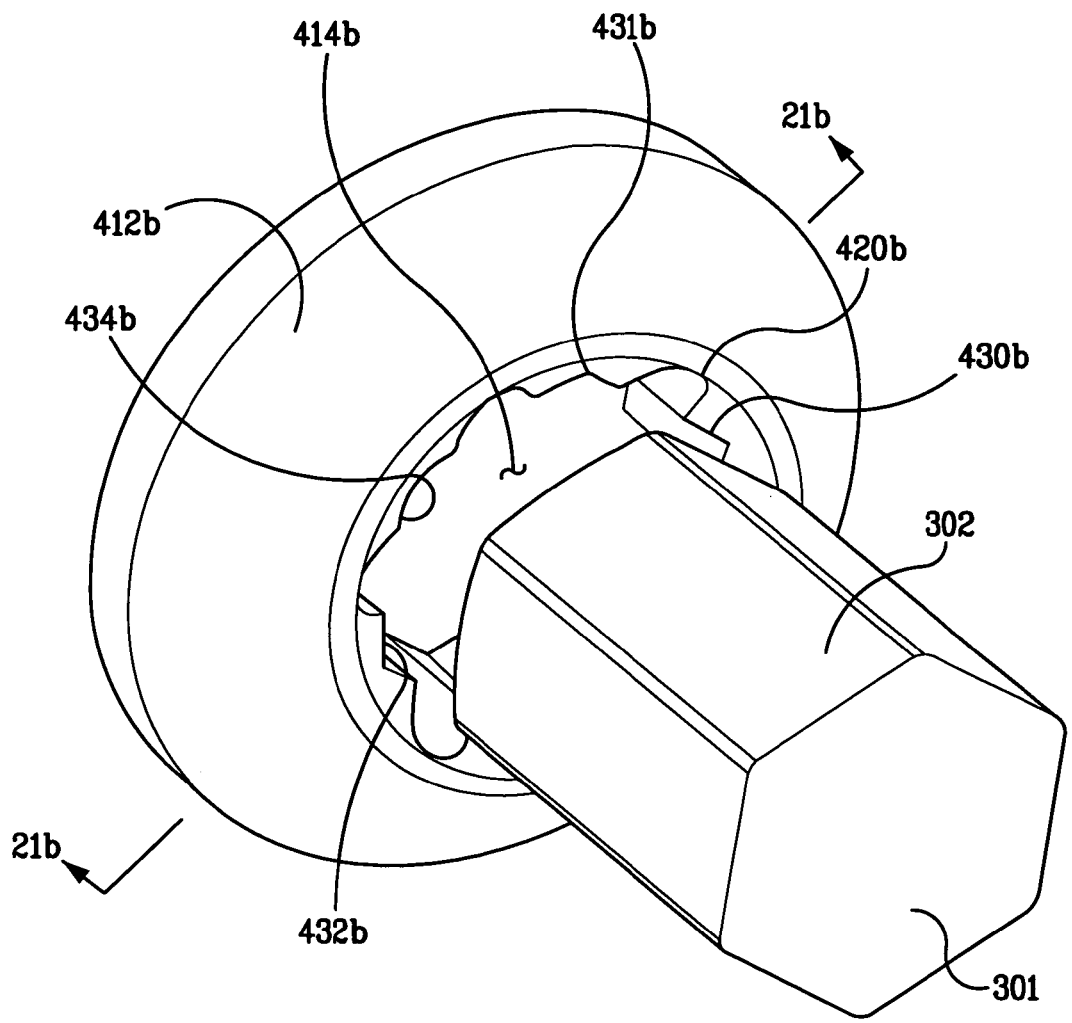
FIG. 18B is a perspective view illustrating engagement of a hexagonal head driver with the fastener shown in FIG. 17B.

In another embodiment of combination socket-type fastener, a fastener 410b can be engaged and driven by each of a conventional lobed-head driver, such as driver 305 illustrated in FIG. 17B, and a conventional hexagonal-head driver, such as driver 301 illustrated in FIG. 18B.

Figure 19B:
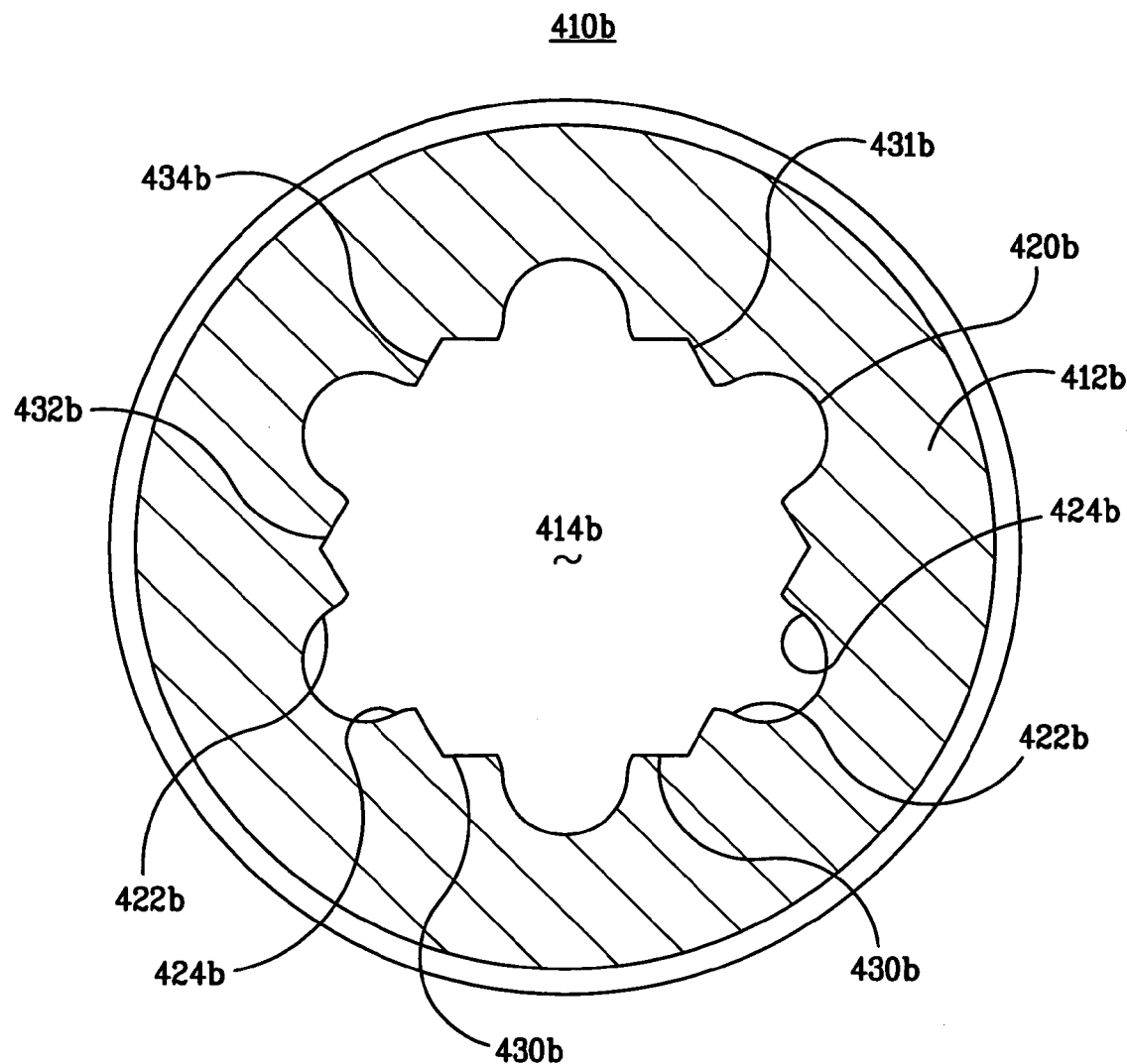
FIG. 19B is a transverse cross-sectional view of the fastener of FIG. 17B.

As best shown in FIG. 19B, which shows a transverse cross section of the head of the fastener 410b, a head 412b has a socket or recess 414b formed therein that includes six planar sidewalls 430b, each of which is divided substantially in half by an outwardly protruding flute 420b. In general, the shape of flutes 420b shown in FIG. 19B preferably is generally same as the flutes of a conventional lobed-head fastener, such that the lobes of a conventional lobed-head driver engage flutes 420b.

In general, the shape of planar sidewalls 430b shown in FIG. 19B preferably is generally same as the planar sidewalls of a conventional hexagonal-head fastener, such that the crests or apexes formed by the sidewalls of a conventional hexagonal-head driver engage the corresponding structure of fastener 410b. In this regard, the socket-type crest of fastener head 410b is identified in the figures as 431b. Each flute 420b includes a flute first side portion 422b and an opposing flute second side portion 424b. Each planar sidewall 430b includes a planar sidewall first side portion 432b and an opposing planar sidewall second side portion 434b.

Preferably, each one of sidewall surfaces 432b and 434b is parallel to a longitudinal axis of fastener 410b. The present invention is not limited to such configuration of sidewall surfaces 432b and 434b, but rather it encompasses any configuration as will be understood by persons familiar with fastener technology in view of the present disclosure. As described below, the configuration of fastener 410b enables it to be engaged and driven by each of a conventional lobed-head driver, such as driver 305 illustrated in FIG. 17B, and a conventional hexagonal-head driver, such as driver 301 illustrated in FIG. 18B.

Figure 20B:
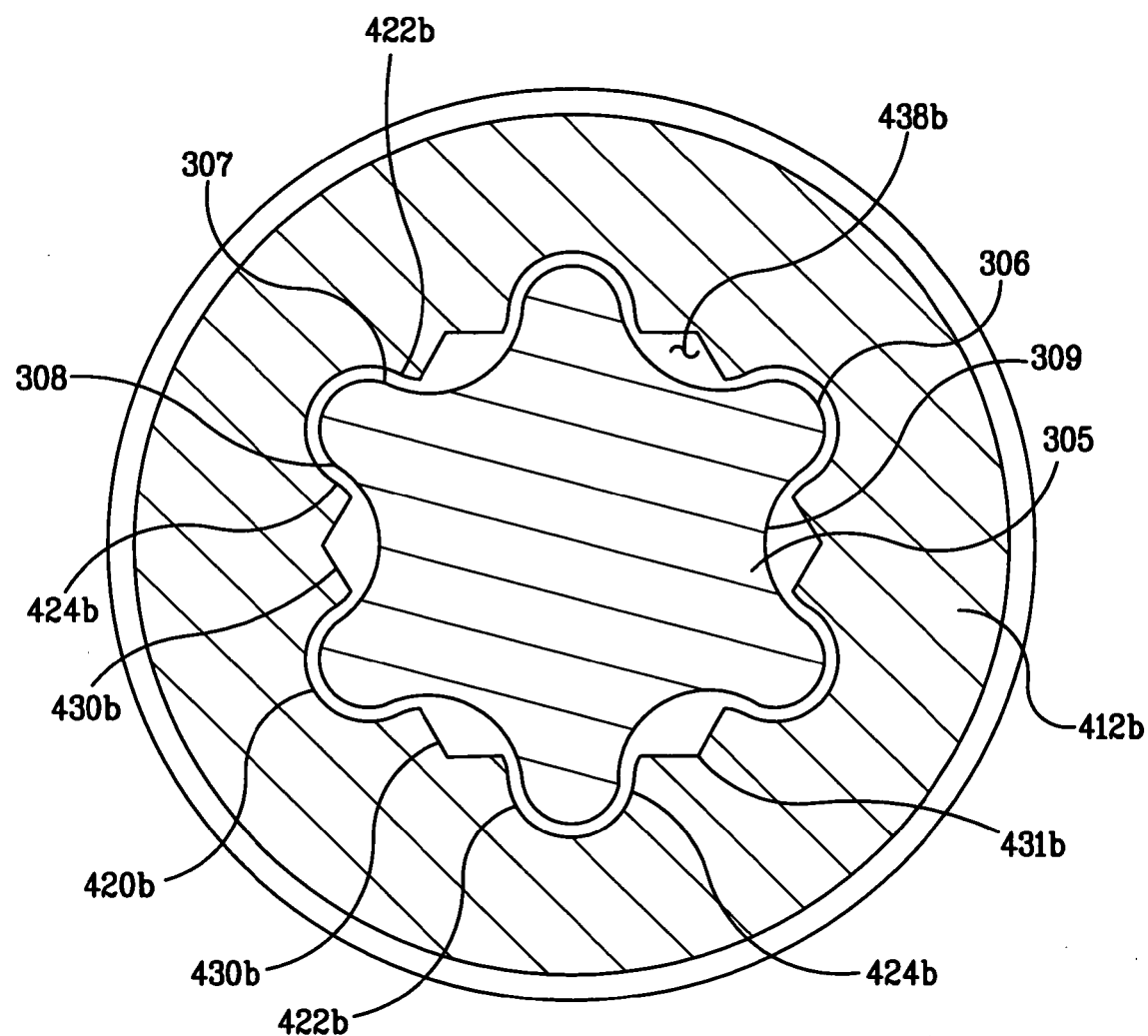
FIG. 20B is a cross sectional view of the fastener and engaged driver shown in FIG. 17B taken through lines 20B—20B.

FIG. 20B shows a cross section through fastener head 412b and a conventional lobed-head driver 305 that includes alternating flutes 309 and lobes 306. First side portion 422b of each flute 420b is contacted by the corresponding first side portion 307 of driver lobe 306 while driving fastener 410b in a clockwise direction, which is the insertion direction for right handed threads. Second side portion 424b of each flute 420b is contacted by the corresponding second side portion 308 of driver lobe 306 while driving fastener 410b in a counter clockwise direction, which is the removal direction for right-handed threads. Driver flutes 309 do not contact fastener planar sidewalls 430b in the embodiment shown in FIG. 20B such that a space or channel 438b is formed between fastener sidewalls 430b, especially crests 431b and driver flutes 309, which enables transmission of fluid therein. The invention, of course, is not limited to such configuration, but rather encompasses a configuration (not shown in the figures) in which driver flutes 309 contact a portion of fastener 410a.

Figure 21B:
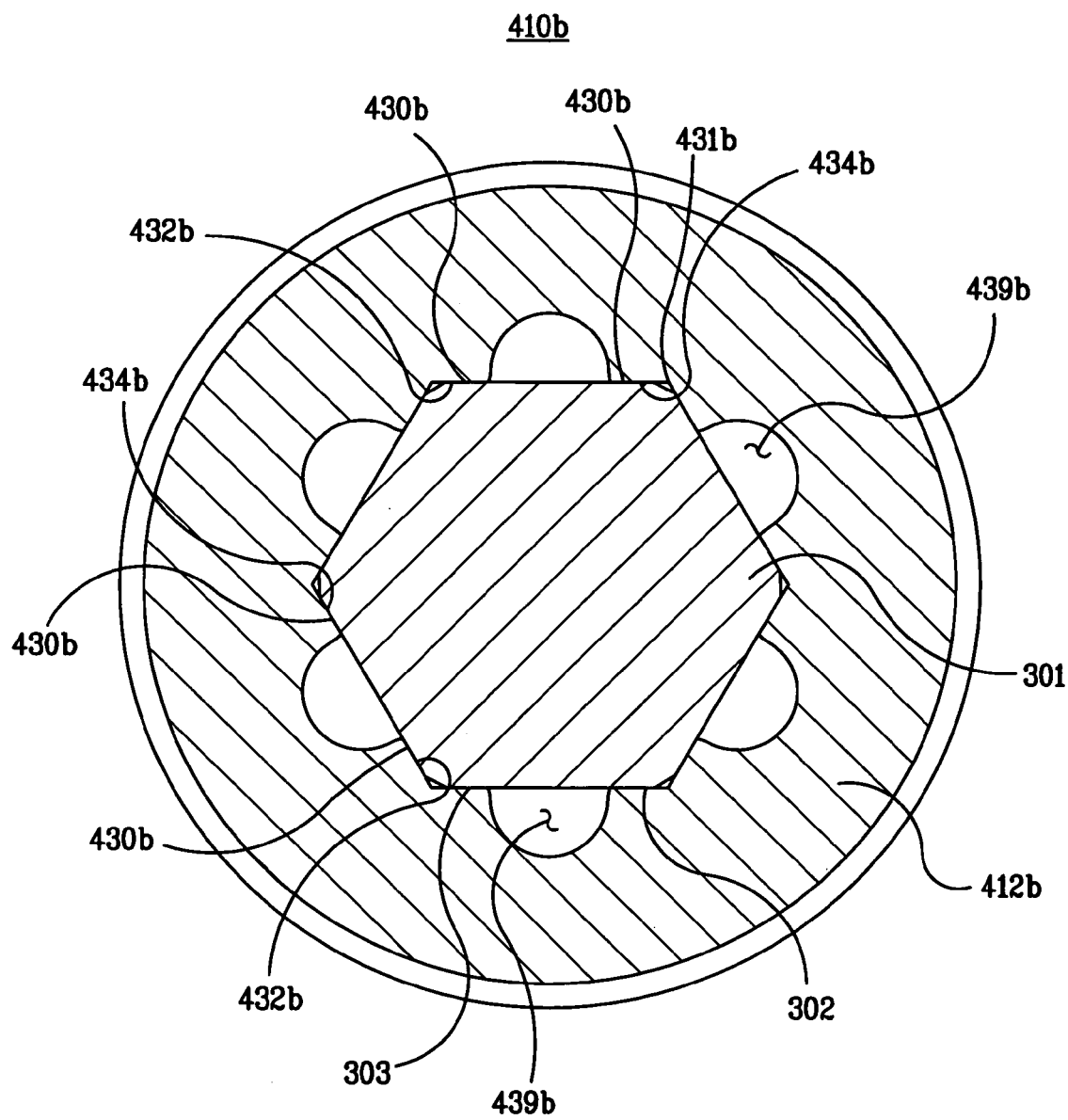
FIG. 21B is a cross sectional view of the fastener and engaged driver shown in FIG. 18B taken through lines 21B—21B.

FIG. 21B shows a cross section taken through fastener head 412b and a conventional hexagonal-head driver 301 that includes six planar sidewalls, each of which preferably is parallel to a driver longitudinal axis. Fastener planar sidewall first side portion 432b is contacted by the corresponding sidewall surface 302 of driver 301 while driving fastener 410b in a clockwise direction, which is the insertion direction for right-handed threads. Fastener planar sidewall second side portion 434b is contacted by the corresponding driver sidewall surface 303 of driver 301 while driving fastener 410b in a counterclockwise direction, which is the removal direction for right-handed threads. The driver sidewall does not contact fastener flutes 420b such that a spaces or channels 438b forms between fastener flutes 420b and the driver sidewalls to enable fluid transmission therein.

The particular embodiments of fastener 410a and 410b shown in FIGS. 17A through 21A and 17B through 21B are based on a Torx® driver. The configuration of alternating flutes 420a or 420b and planar sidewalls 430a or 430b enable fasteners 410a or 410b, respectively, to be engaged by a corresponding conventional hexagonal-head driver, as described above. The present invention is not limited to any particular size, but rather the present invention encompasses any size Torx® driver and corresponding hexagonal-head driver. Further, the present invention is not limited to orthopedic or other surgical applications, but rather encompasses any use to which the fastener 410a or 410b may be employed.

Driver tip 16 is employed to illustrate a use of driver 10. For simplicity, the operation of each of driver tips 16a, 16b, 16c, and 16d; driver 310; and fasteners 50, 410a, and 410b is not specifically recited as operation of each is similar to that of driver 10 having tip 16. For illustration, the operation of driver 10 is provided in the context of an orthopedic operation, even though the present invention is not limited to such use. In an orthopedic surgery, it may be difficult to identify whether a conventional lobed-head fastener, such as fastener 100, or a conventional hexagonal-head fastener, such as fastener 200, had been previously inserted into a body if the fastener type had not been recorded or if the information is not available. In such circumstances, it may be helpful to employ driver 10, which has the capability of driving each one of fasteners 100 and 200, as described above. Accordingly, a surgeon may insert driver 10 into an incision to engage fastener 100 or 200 to, for example, remove the fastener. The ease of use of driver 10, as well as driver tips 16a, 16b, 16c, and 16d and driver 310 is apparent for non-surgical applications, such as any manufacturing or general use.

Similarly, a surgeon may employ combination fastener 50 (or 410a or 410b) in circumstances in which he desires that each of a conventional lobed-head socket-type driver, such as driver 150, (or a conventional hex head driver such as driver 301) and a conventional hexagonal-head socket type driver, such as driver 250, (or a conventional lobed head driver such as driver 305) may be employed. The ease of use of fastener 50 (or 410a or 410b) is apparent for non-surgical applications, such as any manufacturing or general use.

The present invention is not limited to the particular embodiments disclosed herein, but rather encompasses any structure recited by the claims and reasonable variations thereof. Also, the present invention encompasses any combination of any of the various features or structure recited herein, and none of the embodiments disclosed herein are limited solely to use with conventional drivers or fasteners.

What is claimed is:

1. A driver including a shaft defining a longitudinal axis and only one driving tip,
   said tip including alternating flutes and crests,
   each one of the flutes is curved in transverse cross section;
   each one of the crests including a first-side surface and an opposing second-side surface;
   each one of the first-side surface and the second-side surface is substantially straight in transverse cross section;
   whereby the flutes are capable of driving a fastener having a lobed recess and the first-side and the second-side surfaces of the crests are capable of driving another fastener having a straight-walled, hexagonal recess.

2. The driver of claim 1 wherein each one of the flutes includes a first-side portion and a second-side portion, the flute first-side portions are capable of driving the fastener having the lobed recess during clockwise rotation and the flute second-side portions are capable of driving the fastener have the lobed recess during counter-clockwise rotation.

3. The driver of claim 2 wherein the crest first-side surfaces are capable of driving the fastener having the hexagonal recess during clockwise rotation and the crest second-side surfaces are capable of driving the fastener having the hexagonal recess during counterclockwise rotation.

4. The driver of claim 3 wherein a first-side surface of a first crest yields to a first-side portion of a first flute at a first-side transition, the first-side portion of the first flute yields to a second-side portion of the first flute so as to define a flute bottom therebetween, and the second-side portion of the first flute yields to a second-side surface of a second crest at a second-side transition.

5. The driver of claim 1 wherein the crest first-side surfaces and the crest second-side surfaces are planar.

6. The driver of claim 1 wherein the crest first-side surfaces and the crest second-side surfaces are not planar.

7. The driver of claim 6 wherein the crest first-side surfaces and the crest second-side surfaces are straight in transverse cross section.

8. The driver of claim 7 wherein the crest first-side surfaces and the crest second-side surfaces are arcuate in longitudinal profile.

9. The driver of claim 1 wherein the tip is not tapered.

10. The driver of claim 1 wherein the tip is tapered such that the width of the tip decreases proximate its distal end.

11. The driver of claim 1 wherein the tip is back-tapered such that the width of the tip increases proximate its distal end.

12. The driver of claim 1 wherein the flutes are concave.

13. The driver of claim 1 wherein each one of the crest first-side surfaces is approximately coplanar with the crest second-side surface of the immediately adjacent crest.

14. The driver of claim 13 wherein the coplanar first-side surface and second-side surface are interrupted only by a flute.

15. A driver including a shaft defining a longitudinal axis and only one driving tip,
    said tip including alternating flutes and crests,
    each one of the flutes is curved in transverse cross section;
    each one of the crests including a first-side surface and an opposing second-side surface;
    each one of the first-side surface and the second-side surface is substantially straight in transverse cross section, the crest first-side surface and the crest second-side surface forming an angle of approximately 120 degrees therebetween;
    whereby the flutes are capable of driving a fastener having a lobed recess and the crests are capable of driving another fastener having a straight-walled, hexagonal recess.

16. The driver of claim 15 wherein each one of the crest first-side surfaces and the crest second-side surfaces meet at a point in transverse cross section.

17. The driver of claim 15 wherein a junction portion is disposed between the crest first-side surfaces and crest second-side surfaces, the junction portion is flat in transverse cross section.

18. The driver of claim 15 wherein a junction portion is disposed between the crest first-side surface and crest second-side surface, the junction portion is curved in transverse cross section.

19. A socket-head driver including a shaft defining a longitudinal axis and only one driving tip,
    said tip including alternating flutes and crests,
    each one of the flutes is curved in transverse cross section;
    each one of the crests including a first-side surface and an opposing second-side surface,
    each one of the first-side surface and the second side surface is substantially straight in transverse cross section;
    whereby the flutes are capable of driving a fastener having a hexagonal-head and at least one of the flutes and the crests are capable of driving another fastener having a lobed head.

* * * * *